(12) United States Patent
Takeda

(10) Patent No.: US 6,876,632 B1
(45) Date of Patent: Apr. 5, 2005

(54) INTELLIGENT NETWORK WITH AN INTERNET CALL WAITING FUNCTION

(75) Inventor: Yukiko Takeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/404,373

(22) Filed: Sep. 24, 1999

(30) Foreign Application Priority Data

Sep. 25, 1998 (JP) ............................................ 10-270892
Oct. 20, 1998 (JP) ............................................ 10-297828

(51) Int. Cl.$^7$ ........................ H04L 12/16; H04Q 11/00; H04M 3/42; H04M 7/00
(52) U.S. Cl. .................. 370/259; 370/410; 379/215.01; 379/221.09; 379/900
(58) Field of Search ................................ 370/259, 352, 370/356, 345.2, 400, 401, 410, 522; 709/203, 727; 379/900, 213.01, 221.09

(56) References Cited

U.S. PATENT DOCUMENTS

| | | | | |
|---|---|---|---|---|
| 6,014,379 A | * | 1/2000 | White et al. ................ | 370/389 |
| 6,104,800 A | * | 8/2000 | Benson ................... | 379/215.01 |
| 6,144,644 A | * | 11/2000 | Bajzath et al. .............. | 370/259 |
| 6,282,281 B1 | * | 8/2001 | Low ............................ | 379/230 |
| 6,366,661 B1 | * | 4/2002 | Devillier et al. ....... | 379/211.01 |
| 6,661,785 B1 | * | 12/2003 | Zhang et al. ................ | 370/352 |
| 2002/0085542 A1 | * | 7/2002 | Bedingfield et al. ........ | 370/352 |

FOREIGN PATENT DOCUMENTS

| | | |
|---|---|---|
| JP | 9-168033 | 6/1997 |
| JP | 10-145429 | 5/1998 |

OTHER PUBLICATIONS

ITU–T Recommendation, Q. 1221.
ITU–T Recommendation Q. 1224—Fascicle 1/3.

* cited by examiner

*Primary Examiner*—Dang Ton
*Assistant Examiner*—Kevin C. Harper
(74) *Attorney, Agent, or Firm*—Mattingly, Stanger, Malur & Brundidge, P.C.

(57) ABSTRACT

An intelligent network service control point, which is connected with a plurality of switching systems in a transport layer network over a common channel signaling network and with an Internet protocol network through a service control gateway, stores information for indicating that a first terminal is being connected to the Internet in a user information management table when the service control point receives a call waiting service request from the first terminal connected with the transport layer network. When one of said switching systems notifies that the first terminal is called from a second terminal, the service control point sends an incoming notification message to the first terminal through the gateway by referring the user information management table.

3 Claims, 23 Drawing Sheets

FIG. 3A

SCP ADDRESS MANAGEMENT TABLE 400

| TYPE OF MESSAGE | NETWORK ID | SCP ID | SERVICE ID |
|---|---|---|---|
| "IN SERVICE REQUEST" | ... | ... | I-X |
| "NOTIFICATION RESPONSE" | ... | ... | I-X |
| 401 | 402 | 403 | 404 |

FIG. 3B

USER MANAGEMENT TABLE 410

| USER ID | TEL NO. | CORRELATION ID-1 | CORRELATION ID-2 | WWW SERVER ADDRESS | STATE | URL |
|---|---|---|---|---|---|---|
| 411 | 412 | 413 | 414 | 415 | 416 | 417 |

FIG. 4A

REQUEST MANAGEMENT TABLE

| TYPE OF MESSAGE | SERVICE PROGRAM NO. | 430 |
|---|---|---|
|  |  |  |
|  |  |  |
| 431 | 432 |  |

FIG. 4B

SERVICE MANAGEMENT TABLE  440

| SERVICE PROGRAM NO. | SCGW ADDRESS | NETWORK ID | SERVICE NO. | URL |
|---|---|---|---|---|
|  |  |  |  |  |
| 441 | 442 | 443 | 444 | 445 |

FIG. 4C

USER STATE MANAGEMENT TABLE

| USER ID | STATE | CORRELATION ID | 450 |
|---|---|---|---|
|  |  |  |  |
|  |  |  |  |
| 451 | 452 | 453 |  |

FIG. 5A

SERVICE DECISION TABLE　　　460

| TRIGGER | NUMBER INFORMATION | SERVICE KEY | SERVICE NO. | SERVICE PROGRAM NO. | |
|---------|-------------------|-------------|-------------|---------------------|---|
| α | 0120 | — | — | 100 | 460-1 |
| β | — | Q | — | 500 | 460-2 |
| — | — | — | I-X | 600 | 460-3 |
| ⋮ | | | | ⋮ | |
| 461 | 462 | 463 | 464 | 465 | |

FIG. 5B

USER INFORMATION POINTER ADDRESS TABLE　　　470

| SERVICE PROGRAM NO. | TELEPHONE NO. | POINTER ADDRESS | |
|---------------------|---------------|-----------------|---|
| 500 | 0423231111 | XX | 470-1 |
| 500 | 0426210110 | XY | 470-2 |
| 600 | 0423231111 | XX | 470-3 |
| ⋮ | | | |
| 471 | 472 | 473 | |

FIG. 5C

USER INFORMATION MANAGEMENT TABLE　　　480

| ADDRESS | USER ID | TELEPHONE NO. | IP ACCESS FLAG | SCGW ADDRESS | CORRELATION ID-1 |
|---------|---------|---------------|----------------|--------------|------------------|
| XX | AA | 0423231111 | 1 | XXX···XX | ZZZZ |
| XY | BB | 0426210110 | 0 | — | — |
| 481 | 482 | 483 | 484 | 485 | 486 |

| "NOTIFICATION RESPONSE" | MESSAGE LENGTH | CORRELATION ID | SCGW ADDRESS | WWW SERVER ADDRESS | ACTION | FORWARDING DESTINATION |
|---|---|---|---|---|---|---|
| 551 | 552 | 571 | 553 | 554 | 572 | 573 |

| "NOTIFICATION OF INCOMING CALL" | MESSAGE LENGTH | CORRELATION ID | SCGW ADDRESS | WWW SERVER ADDRESS | USER ID | URL |
|---|---|---|---|---|---|---|
| 551 | 552 | 561 | 553 | 554 | 558 | 559 |

| "IN SERVICE REQUEST" | MESSAGE LENGTH | SCGW ADDRESS | WWW SERVER ADDRESS | SERVICE NO. | TELEPHONE NO. (DN) | NETWORK ID | USER ID | URL |
|---|---|---|---|---|---|---|---|---|
| 551 | 552 | 553 | 554 | 555 | 556 | 557 | 558 | 559 |

FIG. 10A

| | |
|---|---|
| "IN SERVICE REQUEST" | 821 |
| MESSAGE LENGTH | 822 |
| CORRELATION ID | 823 |
| SOURCE SCGW ADDRESS | 824 |
| DESTINATION SCP ADDRESS | 825 |
| SERVICE NO. | 826 |
| TELEPHONE NO. (DN) | 827 |
| USER ID | 828 |

| | |
|---|---|
| "NOTIFICATION OF INCOMING CALL" | 821 |
| MESSAGE LENGTH | 822 |
| CORRELATION ID | 823 |
| DESTINATION SCGW ADDRESS | 831 |
| SOURCE SCP ADDRESS | 832 |
| TELEPHONE NO. (DN) | 827 |
| USER ID | 833 |

| | |
|---|---|
| "NOTIFICATION RESPONSE" | 821 |
| MESSAGE LENGTH | 822 |
| CORRELATION ID | 823 |
| SOURCE SCGW ADDRESS | 824 |
| DESTINATION SCP ADDRESS | 825 |
| ACTION | 841 |
| FORWARDING DESTINATION | 842 |

(265)

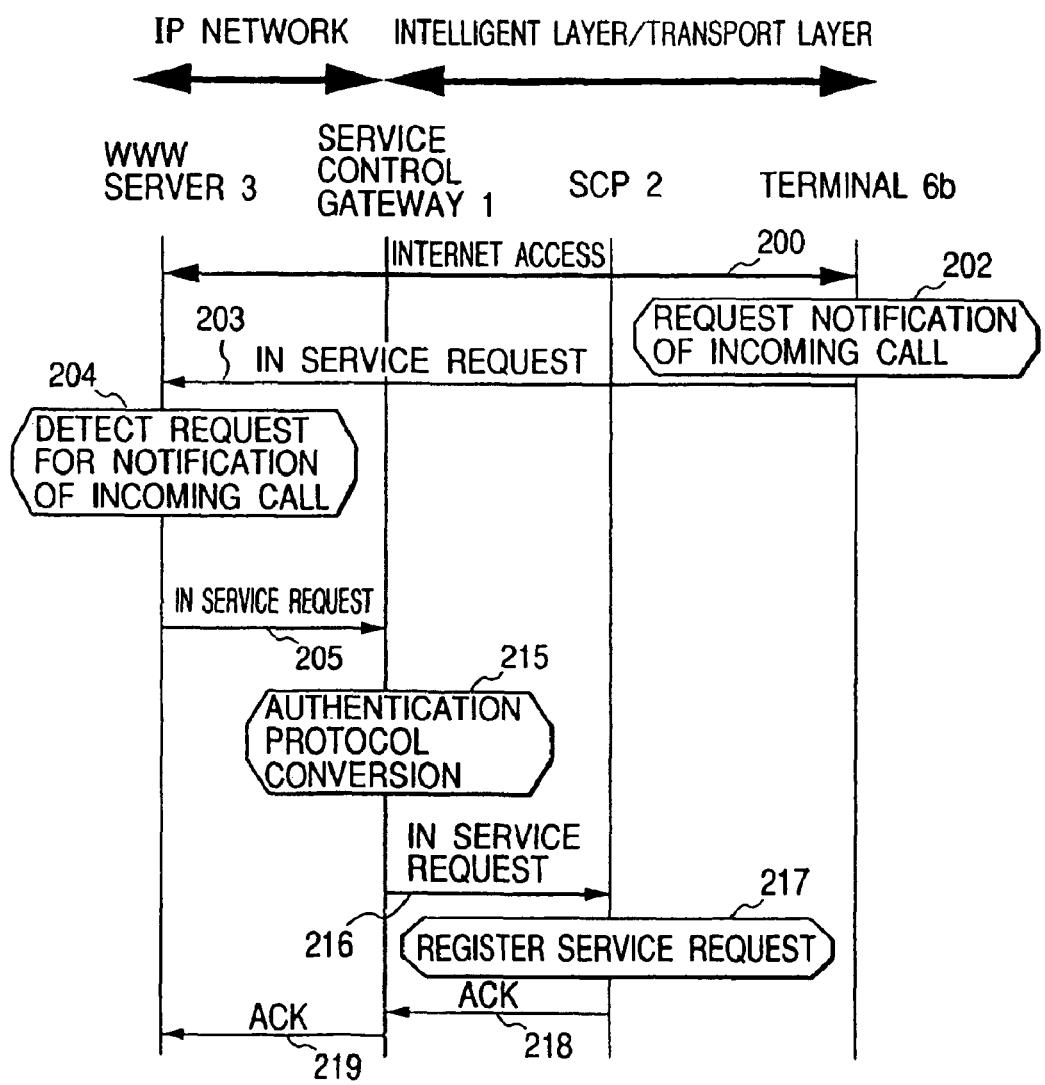

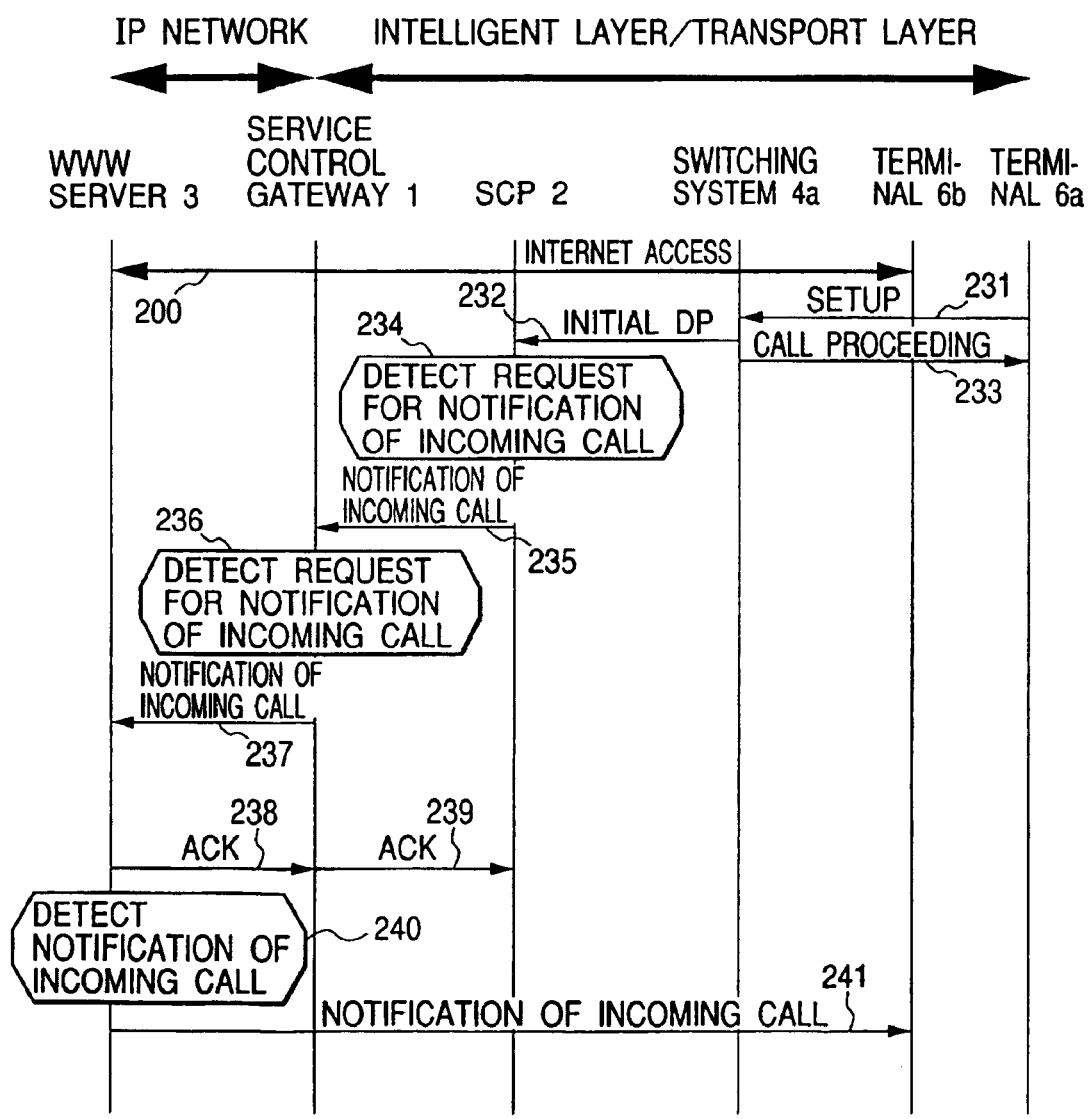

INTELLIGENT NETWORK WITH AN INTERNET CALL WAITING FUNCTION

BACKGROUND OF THE INVENTION

1. Field of the Invention

The present invention relates to an intelligent network (IN) capable of providing services to Internet users. More particularly, the invention pertains to a service control point (SCP) having an Internet call waiting service function in the intelligent network, an Internet protocol (IP) communication apparatus which is connected with an IP network and equipped with a function for communicating with the SCP, and a service control gateway for connecting the SCP and the IP communication apparatus.

2. Description of the Related Art

A dial-up connection is available as one of the methods for making access from a public network to the Internet. With the use of the dial-up connection, a personal computer at home can be connected to the Internet over a conventional public switched telephone network (PSTN) line or an ISDN line for a desired period of time whenever necessary. Where the personal computer or another terminal apparatus is connected to the Internet using the dial-up connection, terminal user (subscriber) authentication and IP address assignment are performed by a gateway arranged for connection between the PSTN or ISDN and the Internet. While a terminal of a user (subscriber) is being connected to the Internet through the dial-up connection, a switching system accommodating the subscriber line of the user terminal can judge whether or not the subscriber line is in a busy state but the switching system cannot judge whether or not the user terminal is being connected to the Internet.

In an intelligent network (IN) which allows customization of services and provision of prompt services, its configuration is so arranged as to provide functional planes (service plane, global function plane, distributed function plane, and physical plane). These planes are specified as "Capability Set 1" (CS-1), and generation and management of services including internetworking services are specified as higher-level "Capability Set 2" (CS-2) in standardization (ITU-T Recommendations : Q.1220 to Q.1228).

The intelligent network comprises a transport layer network including a plurality of switching systems, an intelligent layer network including service control points (SCPs) which are connected with the transport layer network over a common channel signaling network, and a service management point which is connected with the SCPs. As to internetworking services standardized as "IN Capability Set 2" in ITU-T Recommendation Q.1224, methods of providing services for communication between IN networks through cooperation of service data functions and service control functions are defined primarily, but no definition is given to a method of providing communication services through cooperation of IN service control functions and the Internet.

Regarding a method of providing communication services through cooperation of the IN service control functions and the Internet, the ITU-T has proposed a scheme that, for the purpose of transmitting a service request from an Internet user to each IN service control function (SCF), a user agent function for transferring a service request from the user is provided in the Internet and a service control gateway function is provided between the Internet and the public network. However, a concrete method of providing services using these functions and a concrete method of implementing services remain to be resolved in the proposed scheme.

For diversification of communication services, it has recently been desired to provide a new kind of service through cooperation of any IN service control function and the Internet, such as an Internet call waiting (ICW) service. The ICW is a service function whereby, when a user being connected to the Internet is called, the user can receive notification of an incoming call and then indicate how the incoming call is to be further processed (e.g., rejection of incoming call, call forwarding) from a terminal of the user to the IN service control function. Then, as indicated by the user, the IN service control function continues call processing.

In the prior art of telephone networking, however, when a user line is in a busy state, a switching system cannot judge whether the busy state is due to an Internet connection call or a conventional call for telephone-to-telephone connection. In a situation where a user terminal being busy with a conventional call is called, the called terminal can normally receive a call waiting signal which is an analog signal supplied from the switching system. By way of contrast, in a situation where a user terminal being busy with an Internet connection call is called, a call waiting signal (analog signal supplied from the switching system) is treated as noise since the user terminal is sending and receiving digital signals, i.e., the called terminal cannot be notified that another call has arrived. As mentioned above, the ICW service which notifies a user being engaged in an Internet connection call of arrival of another call has not yet been implemented hitherto.

SUMMARY OF THE INVENTION

It is therefore an object of the present invention to provide a communication network which is capable of providing IN services to a user terminal being connected to the Internet.

Another object of the present invention is to provide a service control point having an Internet call waiting service function in an intelligent network.

A further object of the present invention is to provide a service control gateway for connecting the service control point in the intelligent network and the Internet.

In order to achieve these objects, according to the present invention, there is provided an intelligent network service control point, which is connected with a plurality of switching systems in a transport layer network over a common channel signaling network and connected with an Internet protocol network through a service control gateway, having a user information management table for indicating whether or not a plurality of terminals included in the transport layer network are being connected to the Internet. When one of these terminals being busy is called, the user information management table is referenced to judge whether the called terminal is currently busy with a conventional call or an Internet connection call. If the called terminal is currently busy with an Internet connection call, the service control point notifies the called terminal of arrival of another call through the service control gateway over the Internet.

More specifically, according to one aspect of the present invention, there is provided an intelligent network service control point, comprising: first means for storing information indicating that a first terminal is being connected to the Internet into the user information management table when a call waiting service request is received from the first terminal, which is being connected to the Internet protocol network, over the transport layer network; and second means for sending an incoming call notification message destined for the first terminal to the gateway with reference to the user information management table when a notification indicating that the first terminal is called from a second terminal is received from one of a plurality of switching systems.

The user information management table stores an entry including, for example, such items as a telephone number of the first terminal, flag information for indicating whether or not the first terminal is being connected to the Internet, and address information of the gateway. The contents of the entry is updated by the first means, and the second means makes reference to the flag information and address information in the entry.

Still further, in the intelligent network service control point according to the present invention, upon receipt of a notification response message indicating a response from a user of the first terminal in reply to the incoming call notification message through the gateway, the second means instructs one of the plurality of switching systems to carry out a connection service for an incoming call to the first terminal according to the response stated above.

Furthermore, according to the present invention, there is provided a service control gateway through which an intelligent network service control point having a connection with a plurality of switching systems in a transport layer network over a common channel signal network is connected with an Internet protocol network having a connection with the transport layer network, comprising: protocol conversion means for protocol-wise converting a service request message for requesting an Internet call waiting service of the service control point into a message addressed to the service control point which includes an identifier for identifying one of a plurality of service control programs to be executed on the service control point, said service request message having been received from a first terminal being connected to the Internet protocol network over the transport layer network; and means for sending the thus protocol-wise converted message to a signal line connected with the service control point.

Further, according to another aspect of the present invention, the service control gateway comprises protocol conversion means for protocol-wise converting an incoming call notification message, which is received from the service control point and indicates arrival of an incoming call from a second terminal to the first terminal, into a message addressed to a server being in communication with the first terminal, said server being included in the Internet protocol network and having a function for transferring a message received from the service control gateway to the first terminal; and means for sending the protocol-wise converted message to a signal line connected with the server.

Further, according to another aspect of the present invention, the service control gateway is provided with protocol conversion means for protocol-wise converting an incoming call notification message, which is received from the service control point and indicates arrival of an incoming call from a second terminal to the first terminal, into a message addressed to an access point apparatus being in communication with the first terminal, said access point apparatus being included in the Internet protocol network and having a function for transferring messages received from the service control gateway to the first terminal; and means for sending the thus protocol-wise converted message to a signal line connected with the Internet protocol network.

The foregoing and other objects, advantages, manners of the operation and novel features of the present invention will be understood from the following detailed description when read in conjunction with the accompanying drawings.

BRIEF DESCRIPTION OF THE DRAWINGS

FIG. 3A is a diagram showing a structure of an SCP address management table formed in the SCGW 1;

FIG. 3B is a diagram showing a structure of a user management table formed in the SCGW 1;

FIG. 4A is a diagram showing a structure of a request management table formed in the WWW server 3 indicated in FIG. 1;

FIG. 4B is a diagram showing a structure of a service management table formed in the WWW server 3;

FIG. 4C is a diagram showing a structure of a user state management table formed in the WWW server 3;

FIG. 5A is a diagram showing a structure of a service decision table formed in the SCP 2 indicated in FIG. 1;

FIG. 5B is a diagram showing a structure of a user information pointer address table contained in the SCP 2;

FIG. 5C is a diagram showing a structure of a user information management table contained in the SCP 2;

FIG. 8A is a diagram showing a format for a service request message sent from the WWW server 3 to the SCGW 1;

FIG. 8B is a diagram showing a format for an incoming call notification message sent from the SCGW 1 to the WWW server 3;

FIG. 8C is a diagram showing a format for a notification response message sent from the WWW server 3 to the SCGW 1;

FIG. 10A is a diagram showing a format for a service request message sent from the SCGW 1 to the SCP 2;

FIG. 10B is a diagram showing a format for an incoming call notification message sent from the SCP 2 to the SCGW 1;

FIG. 10C is a diagram showing a format for a notification response message sent from the SCGW 1 to the SCP 2;

FIG. 11 is a signal sequence diagram showing control signals and messages which are transmitted in the communication network presented in FIG. 1 when a service request message indicating a request for notification of an incoming call is issued from the terminal;

FIG. 12 is a signal sequence diagram showing control signals and messages which are transmitted in the communication network presented in FIG. 1 when the above-noted terminal is called;

DESCRIPTION OF THE PREFERRED EMBODIMENTS

Figure 1:
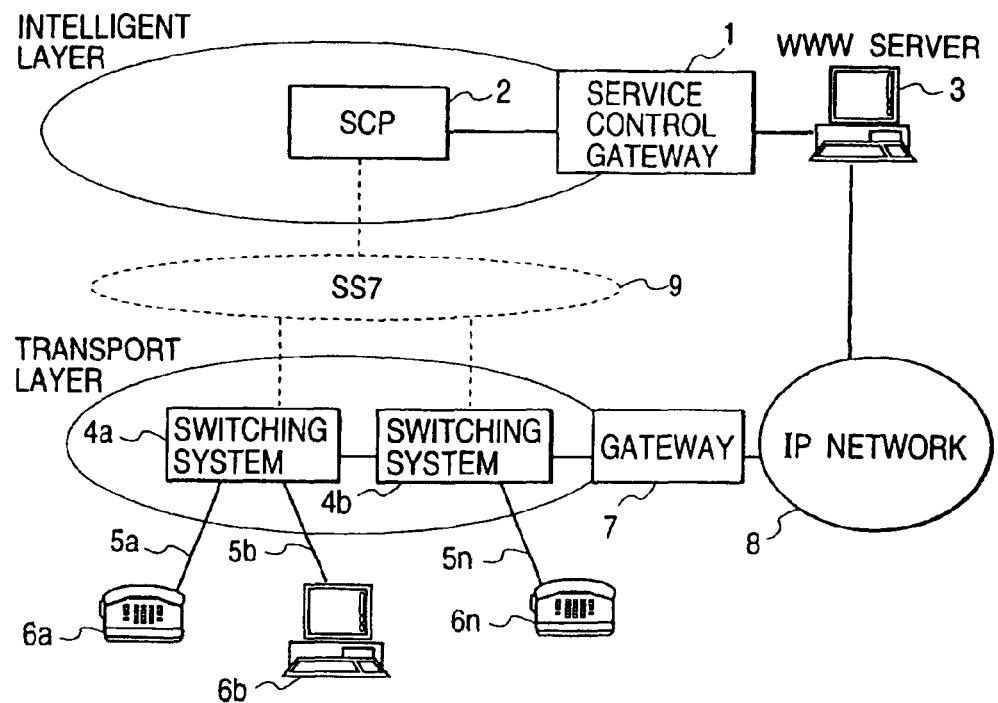
FIG. 1 is a diagram showing a network configuration in a first preferred embodiment of the present invention where an SCP in an intelligent network is connected with a WWW server 3 in an IP network through a service control gateway 1.

Referring first to FIG. 1, there is shown a network configuration in a first preferred embodiment of the present invention where an SCP in an intelligent network is connected with a WWW server 3 in an IP network through a service control gateway 1.

The intelligent network (IN) comprises an intelligent layer network including the service control point (SCP) 2, a transport layer network including a plurality of switching systems 4 (4a, 4b) accommodating a plurality of subscriber terminals 6 (6a to 6n) through individual subscriber lines 5 (5a to 5n), and a common channel signaling network 9 of Signaling System No. 7 (SS7), for example, for connecting the intelligent layer network and the transport layer network. The intelligent network includes a service management point (SMP) connected with the SCP, but the SMP is not shown in the drawing since it is not directly related to the present invention. Each of the switching systems 4 is also referred to as a service switching point (SSP).

The SCP 2 is provided to carry out special switching services that cannot be supported by each switching system alone. Using the SCP 2, it is possible to implement special network-wide services and customer services. The special network-wide services include a free dial service whereby a called user is charged when a caller dials a pre-specified number, and a number conversion service, for example, and the special customer services include different kinds of services to be provided in different time zones by making access to incoming call service data pre-registered for each user, for example.

Upon detection of a call, for instance, each switching system 4 generates a new BCSM (basic call state model) corresponding to the call (or a dial number thereof), and the subsequent call processing is carried out according to the BCSM thus generated. Each BCSM comprises a plurality of states (or steps), some of which are defined as DPs (detection points) corresponding to trigger setup objects for accessing SCPs. In a situation where a call requiring access to the SCP 2 (IN call) is detected, the switching system 4 generates a BCSM containing a trigger pre-specified for a particular DP associated with each kind of IN service. When a call state transition is made to the particular DP, a message corresponding to the kind of trigger pre-specified for the particular DP is sent from the switching system 4 to the SCP 2. Then, the SCP 2 provides a special switching service for each call by carrying out a service program determined according to the kind of trigger. Contrarily, in a situation where a call not requiring access to the SCP 2 (conventional call) is detected, the switching system 4 generates a BCSM containing no trigger for accessing the SCP 2. Then, in the switching system 4, call processing is carried out on a closed internal basis.

According to the first preferred embodiment of the present invention, the Internet protocol (IP) network 8 is connected with the transport layer network of the IN through an access point 7 comprising a gateway, and the IP network 8 is also connected with the SCP 2 of the IN through the WWW server 3 and the service control gateway (SCGW) 1, for example.

Figure 2:
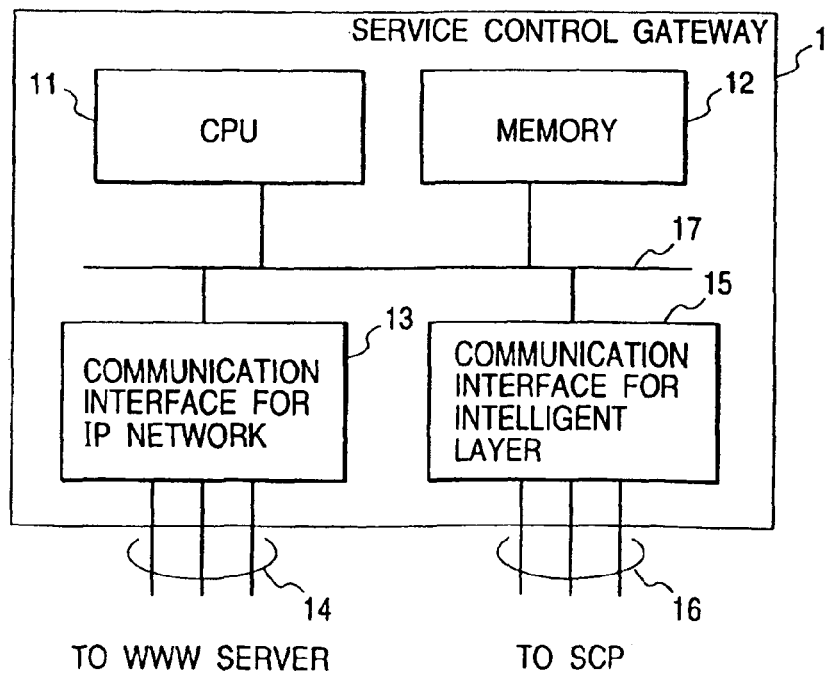
FIG. 2 is a diagram showing a configuration of the service control gateway (SCGW) 1 indicated in FIG. 1.

Referring to FIG. 2, there is shown a configuration of the service control gateway (SCGW) 1.

The SCGW 1 comprises a CPU 11 for controlling communication between the SCP 2 and the WWW server 3, a memory 12, an IP network-communication interface 13 for terminating a signal line 14 connected with the WWW server, an intelligent layer communication interface 15 for terminating a signal line 16 connected with the SCP, and bus 17 for connecting these component elements.

The SCGW 1 is used for format conversion and transfer of control messages relating to Internet call waiting service to be transmitted between the WWW server 3 and the SCP 2. The memory 12 in the SCGW 1 contains programs for message format conversion and message transfer, information necessary for user authentication, an SCP address management table 400 shown in FIG. 3A, and a user management table 410 shown in FIG. 3B.

The SCP address management table 400 is referred to in order to determine an SCP to be accessed when a message is received from the Internet (the WWW server 3 in the present embodiment). As shown in FIG. 3A, the SCP address management table 400 defines an SCP address 403 indicating a destination of a received message and a service number 404 in correspondence with a type-of-message code 401 and a network ID 402.

Although only one SCP 2 is connected with the SCGW 1 in FIG. 1, the SCP address management table 400 shown in FIG. 3A is structured on the assumption that a plurality of SCPs are connected with the SCGW 1 in the communication network. Thus, each received message is transferred to a different SCP according to each network ID of an intelligent network where an Internet call waiting service requester terminal is accommodated. Each service number 404 represents information for specifying a service program to be executed on the SCP 2 in lieu of trigger information.

The user management table 410 comprises a plurality of entries (or records) generated for each user ID as shown in FIG. 3B. Each entry includes in correspondence with a user ID 411, a telephone number 412 indicating an Internet call waiting service requester terminal, a correlation ID 413 to be used for judgment on correspondence relationship between a transmitted message and a received message in communication between the SCP and the SCGW 1, a correlation ID 414 to be used for judgment on correspondence relationship between a transmitted message and a received message in communication between the WWW server 3 and the SCGW 1, a WWW server address 415, a service state code 416, and URL identification information 417 indicating a storage location for incoming call notification display data to be sent from the WWW server to a service requester terminal.

The WWW server 3 stores various service information available on the Internet, and each user can view desired service information by communicating with the WWW server 3 through the use of a browser installed in a terminal of the user. In the present embodiment, for supporting an Internet call waiting service, the WWW server 3 is provided with a request management table 430 shown in FIG. 4A, a service management table 440 shown in FIG. 4B, and a user state management table 450 shown in FIG. 4C, for example.

As shown in FIG. 4A, in the request management table 430, a service program number 432 indicating a service program to be executed is defined in correspondence with a type-of-message code (or type-of-request code) 431 indicating the type of a message received from the terminal 6 or the SCGW 1. Upon receipt of an Internet call waiting (ICW) service control message such as an IN service request message, an incoming call notification message or a notification response message which will be described later, the WWW server carries out one of service programs prepared therefor.

As shown in FIG. 4B, in the service management table 440, an SCGW address 442, a network ID 443, a service number 444 and a URL 445 indicating a storage location for incoming call notification display data are defined in correspondence with a service program number (432) 441 indicating an ICW service program shown in the request management table 430.

As shown in FIG. 4C, in the user state management table 450, a service state code 452 and a correlation ID 453 used for judgment on correspondence relationship between a transmitted message and a received message in communication between the WWW server 3 and the SCGW 1 are defined in correspondence with a user ID 451. Each correlation ID 453 to be used in the WWW server 3 is specified by the SCGW 1.

Referring to FIGS. 5A to 5C, there are shown examples of tables prepared in the SCP 2 to provide the ICW service.

FIG. 5A shows a service decision table 460.

The service decision table 460 comprises a plurality of entries, each of which defines a program number 465 for indicating a service control program to be executed according to a combination of trigger information 461 indicated by an IN service request which is issued from the switching system at a predetermined detection point (DP) in basic call processing, number information 462 indicating a part of a dial number, and a service key 463 assigned to each of plural subscriber lines of a public network. In the following discussion, it is assumed that a service control program having a program number "500" indicated in an entry 460-2 is designed as a service control program that provides a function capable of referencing user information stored in a user information management table 480 shown in FIG. 5C for a called telephone number on the basis of a user information pointer address table 470 shown in FIG. 5B.

An IN service request message for the ICW service given from the SCGW 1 to the SCP 2 contains no trigger information, which is unlike an IN service request issued from the switching system. Therefore, for supporting the ICW service by the SCP in the present invention, a service number 464 is used in lieu of the combination of the trigger information 461, number information 462 and service key 463. In the service decision table 460 mentioned above, a program number of a service control program for the ICW service ("600" in the present example) is defined in correspondence with the service number 464.

FIG. 5B shows the user information pointer address table 470 which is referred by service control programs in the SCP.

In the user information pointer address table 470, a pointer address 473 indicating an entry in the user information management table 480 shown in FIG. 5C is stored in correspondence with a combination of a program number 471 and a telephone number (dial number) 472. In the present invention, as shown in entries 470-1 and 470-3, the entries of the user information pointer address table 470 are so arranged that the same pointer address "xx" can be attained for a telephone number "0423231111" authorized to receive the ICW service when access is made from either the service control program "500" or the service control program "600."

FIG. 5C shows the user information management table 480.

In each entry of the user information management table 480, a user ID 482, a telephone number (DN) 483, an IP access flag 484 indicating whether or not a user is in access to the Internet, an SCGW address 485 indicating a destination of a control message, and an correlation ID 486 to be used for judgment on correspondence relationship between a transmitted message and a received message in communication between the SCP and the SCGW are contained in correspondence with a pointer address (473) 481 indicated in the user information pointer address table 470. Each correlation ID 486 to be used in the SCP is specified by the SCGW.

In the present preferred embodiment, when an ICW service request is made by a user terminal being connected to the Internet, the service request (IN service request message) is sent to the SCP 2 through the WWW server 3 and the SCGW 1. Then, using the service control program "600," the IP access flag 484 in the user information management table 480 is set to indicate that the user terminal is currently in IP access. Thereafter, upon arrival of a call to the user, the SCP 2 runs the service control program "500"

to make reference to the user information management table 480. If it is found that the called terminal is currently in IP access, the user is notified of arrival of the call by means of IP packet transmission through the SCGW 1 and the WWW server 3. If it is found that the called terminal is not currently in IP access, an IN service requester switching system notifies the user of arrival of the call.

Figure 6:
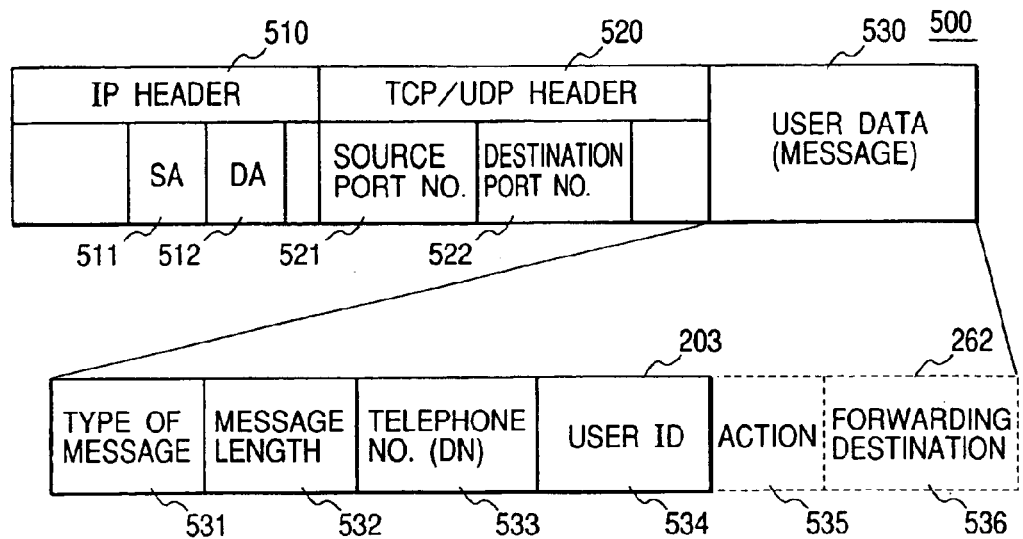
FIG. 6 is a diagram showing an example of a packet format used for communication between a terminal 6 and the WWW server 3 indicated in FIG. 1.

Referring to FIG. 6, there is shown a format for an IP packet 500 transmitted for the ICW service between the terminal 6 and the WWW server 3.

The IP packet 500 comprises an IP header 510, a TCP/UDP header 520 and a user data field 530. A control message for the ICW service is set in the user data field 530.

An IN service request message 203 sent from the terminal 6 to the WWW server 3 contains a type-of-message code 531, a message length indicator 532, a requester terminal telephone number 533, and a user ID 534. In a notification response message 262 sent from the terminal 6 to the WWW server 3, an action code 535 indicating how to process an incoming call (how to further process it), which is shown by broken lines in FIG. 6, is contained in addition to the above items 531 to 534. In a case where the action code 535 indicates a call forwarding service, a destination telephone number of call forwarding 356 follows the action code 535.

For communication between SCGW 1 and the WWW server 3, a message format under examination by the PINT (PSTN and Internet Internetworking) Working Group of the IETF (Internet Engineering Task Force) is applicable, for example. Further, for communication between the SCGW 1 and the SCP 2, a message format for IN is applicable, for example.

Figure 7:
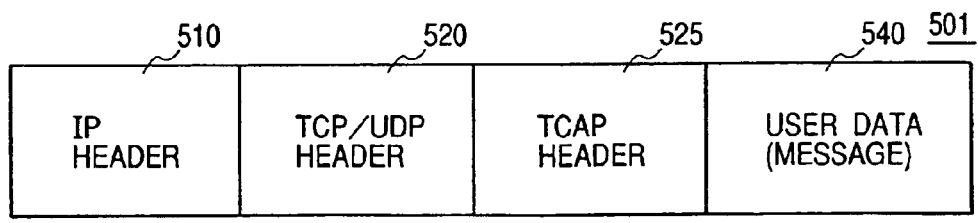
FIG. 7 is a diagram showing an example of a packet format used for communication between the WWW server 3 and the service control gateway (SCGW) 1 indicated in FIG. 1.

Referring to FIG. 7, there is shown a format for a packet 501 to be used for communication between the SCGW 1 and the WWW server 3.

The packet 501 comprises an IP header 510, a TCP/UDP header 520, a TCAP (Transaction Capability Application Part) header 525, and a user data field 540. A message shown in FIGS. 8A to 8C is set in the user data field 540.

Referring to FIG. 8A, there is shown a format for an IN service request message 205 transferred from the WWW server. 3 to the SCGW 1.

An IN service request message 205 is generated according to an IN service request message 203 received from the terminal. The IN service request message 205 comprises a plurality of fields indicating a type-of-message code 551, a message length 552, an SCGW address 553, a WWW server address 554, a service number 555, a telephone number (dial number) 556, a network ID 557, a user ID 558, and a URL 559.

A code indicating that the message concerned is an IN service request message is set in the type-of-message field 551. A telephone number 533 and a user ID 534 indicated in the IN service request message 203 received from the terminal are set in the telephone number field 556 and the user ID field 558, respectively. Data attained from the user management table 440 is set in the fields 553, 555, 557 and 559. An address of the server 3 is set in the WWW server address field 554.

Referring to FIG. 8B, there is shown a format for an incoming call notification message 237 which is generated by the SCGW 1 according to an incoming call notification message 235 received from the SCP 2 as will be described with reference to FIG. 10B and which is sent to the WWW server 3.

The incoming call notification message 237 comprises a plurality of fields indicating a type-of-message code 551 which signifies that the message concerned is a notification of an incoming call, a message length 552, an SCGW address 553, a WWW server address 554, a user ID 558, a URL 559, and a correlation ID 561. The correlation ID 561 is used for judgment on correspondence relationship between the incoming call notification message 237 and a notification response message 264 to be received from the WWW server later. A value of the correlation ID 414 attained from the user management table 410 shown in FIG. 3B is applied to the correlation ID 561.

Referring to FIG. 8C, there is shown a format for a notification response message 264 which is generated by the WWW server 3 according to a notification response message 262 received from the terminal and which is sent to the SCGW 1.

The notification response message 264 comprises a plurality of fields indicating a type-of-message code 551 which signifies that the message concerned is a response to notification, a message length 552, an SCGW address 553, a WWW server address 554, a correlation ID 571, an action code 572, and a destination telephone number of call forwarding 573. The correlation ID 571 has a value identical to that of the correlation ID 561 specified in the incoming call notification message 237 shown in FIG. 8B.

Figure 9:
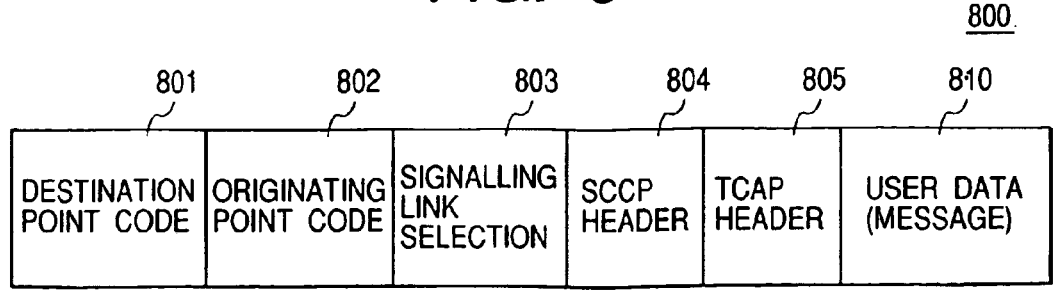
FIG. 9 is a diagram showing an example of a packet format used for communication between the SCGW 1 and the service control point (SCP) 2 indicated in FIG. 1.

Referring to FIG. 9, there is shown a format for a packet 800 to be used for communication between the SCGW 1 and the SCP 2.

The packet 800 comprises a destination point code 801, an originating point code 802, a signaling link selection code 803, an SCCP (Signaling Connection Control Part) header 804, a TCAP (Transaction Capabilities Application Part) header 805, and a user data field 810. Messages shown in FIGS. 10A to 10C are set in the user data field 810.

The signaling link selection code 803 indicates information for specifying an active link in a duplicated arrangement including active and standby links.

Referring to FIG. 10A, there is shown a format for an IN service request message 216 sent from the SCGW 1 to SCP 2.

An IN service request message 216 is generated by the SCGW 1 according to an IN service request message 205 received from the WWW server (shown in FIG. 8A). The IN service request message 216 comprises a plurality of fields indicating a type-of-message code 821, a message length 822, a correlation ID 823, a source SCGW address 824, a destination SCP address 825, a service number 826, a telephone number (dial number) 827, and a user ID 828.

A code indicating that the message concerned is an IN service request message is set in the type-of-message field 821. Data retrieved from the SCP address management table 400 is set in the destination SCP address field 825 and the service number field 826. A value of the correlation ID 413 in the user management table 410 is set in the correlation ID field 823. An address of the SCGW 1 is set in the source SCGW address field 824, and data attained from an IN service request message 205 received from the WWW server is set in the other item fields 827 to 828.

In a case where the user data field 810 of the packet 800 contains the IN service request message 216 mentioned above, an address of the SCP 2 is set as the destination point code 801 and an address of the SCGW 1 is set as the originating point code 802.

Upon receiving the IN service request message 216, the SCP 2 carries out the program "600." Thus, "1" is set in the IP access flag 484 of the corresponding entry in the user management table 480, and values of the SCGW address 824 and the correlation ID 823 indicated in the IN service request message 216 are set in the SCGW address 485 and the correlation ID 486, respectively.

Referring to FIG. 10B, there is shown a format for an incoming call notification message 235 which is generated by the SCP 2 when an IN service request for indicating an incoming call to an IN service subscriber is received from the switching system and which is sent to the SCGW 1.

The incoming call notification message 235 comprises a plurality of fields indicating a type-of-message code 821 which signifies that the message concerned is a notification of an incoming call, a message length 822, a correlation ID 823, a destination SCGW address 831, a source SCP address 832, a called telephone number 827, and a user ID 833. A value indicated by the correlation ID 486 in the user management table 480 is set in the correlation ID 823.

Referring to FIG. 10C, there is shown a format for a notification response message 265 which is generated by the SCGW 1 according to a notification response message 264 received from the WWW server 3 and which is sent to the SCP 2.

The notification response message 265 comprises a plurality of fields indicating a type-of-message code 821 which signifies that the message concerned is a response to notification, a message length 822, a correlation ID 823, a source SCGW address 824, a destination SCP address 825, an action code 841, and a destination telephone number of call forwarding 842. A value indicated by the correlation ID 413 in the user management table 410 is set in the correlation ID 823, and this value is identical to that of the correlation ID 823 in the incoming call notification message 235.

Figure 13:
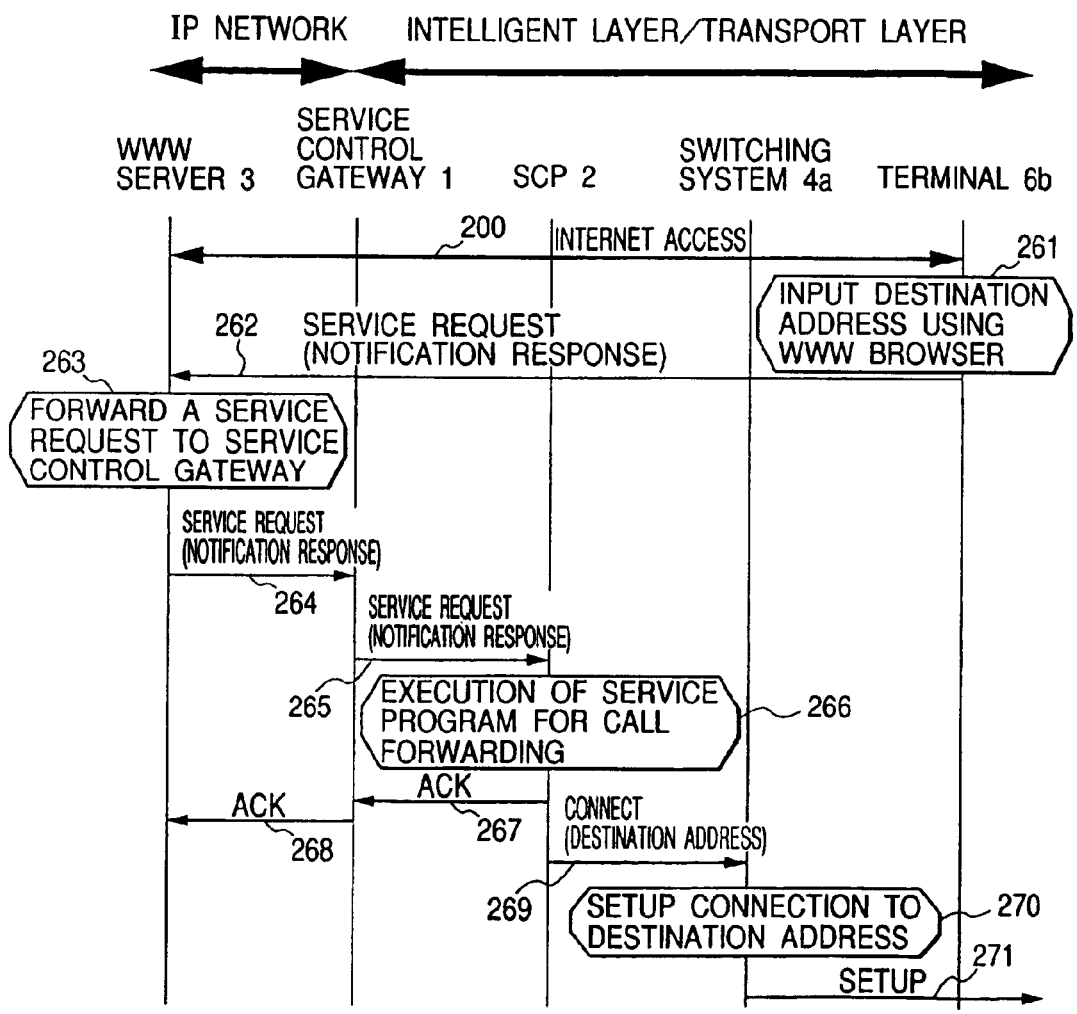
FIG. 13 is a signal sequence diagram showing control signals and messages which are transmitted in the communication network presented in FIG. 1 when a notification response message is issued from the above-noted terminal.

Then, the following describes Internet call waiting service control procedures to be performed in the communication network configuration shown in FIG. 1 with particular reference to signal sequence diagrams shown in FIGS. 11 to 13.

Referring to FIG. 11, there are shown a message sequence and operations of the WWW server 3, the SCGW 1 and the SCP 2 which are carried out when a user of a terminal 6b having subscription to the ICW service performs an input operation to make an IN service request (202) for receiving an incoming call notification from the SCP while the user is in access (200) to the Internet (WWW server 3) through the switching systems 4a and 4b and the access point 7 (e.g., a gateway).

On the terminal 6b, a browser is run for communication with the WWW server. When requesting the IN service, the user enters a telephone number (DN) of the terminal 6b and a user ID on the window screen of the browser and then the user clicks an IN SERVICE REQUEST button (202), for example. Thus, an IN service request message 203 containing the telephone number (DN) 533 and the user ID 534 shown in FIG. 6 is generated. Then, to the WWW server 3, an IP packet is sent which has the user data field 530 containing the generated IN service request message 203 and the IP header 510 containing an address of the WWW server as a destination address (SA) 511 and an address of the terminal 6b as a source address (DA) 512.

Upon receiving the IN service request message 203, the WWW server 3 detects reception of the IN service request according to the type-of-message code 531 of the received message (204). Then, the WWW server 3 carries out a service program corresponding to the type-of-message code 531 of the received message defined in the request management table 430. Thus, a new entry which has a search key 451 corresponding to the user ID 534 extracted from the received message 203 is added to the user state management table 450. A state code indicating that the IN service is being requested is set in the state field 452 of the entry. Further, an IN service request message 205 shown in FIG. 8A is generated according to the SCGW address 442 indicating a destination of the IN service request, the service providing network ID 443, the service number 444 and the URL 445, which are retrieved from the service management table 440, and according to the telephone number (DN) 533 and the user ID 534, which are extracted from the received message 203. The IN service request message 205 thus generated is sent to the SCGW 1 as an IP packet which contains the address of the SCGW 1 in the destination address field 511 of the IP header 510 as shown in FIG. 7.

Figure 14:
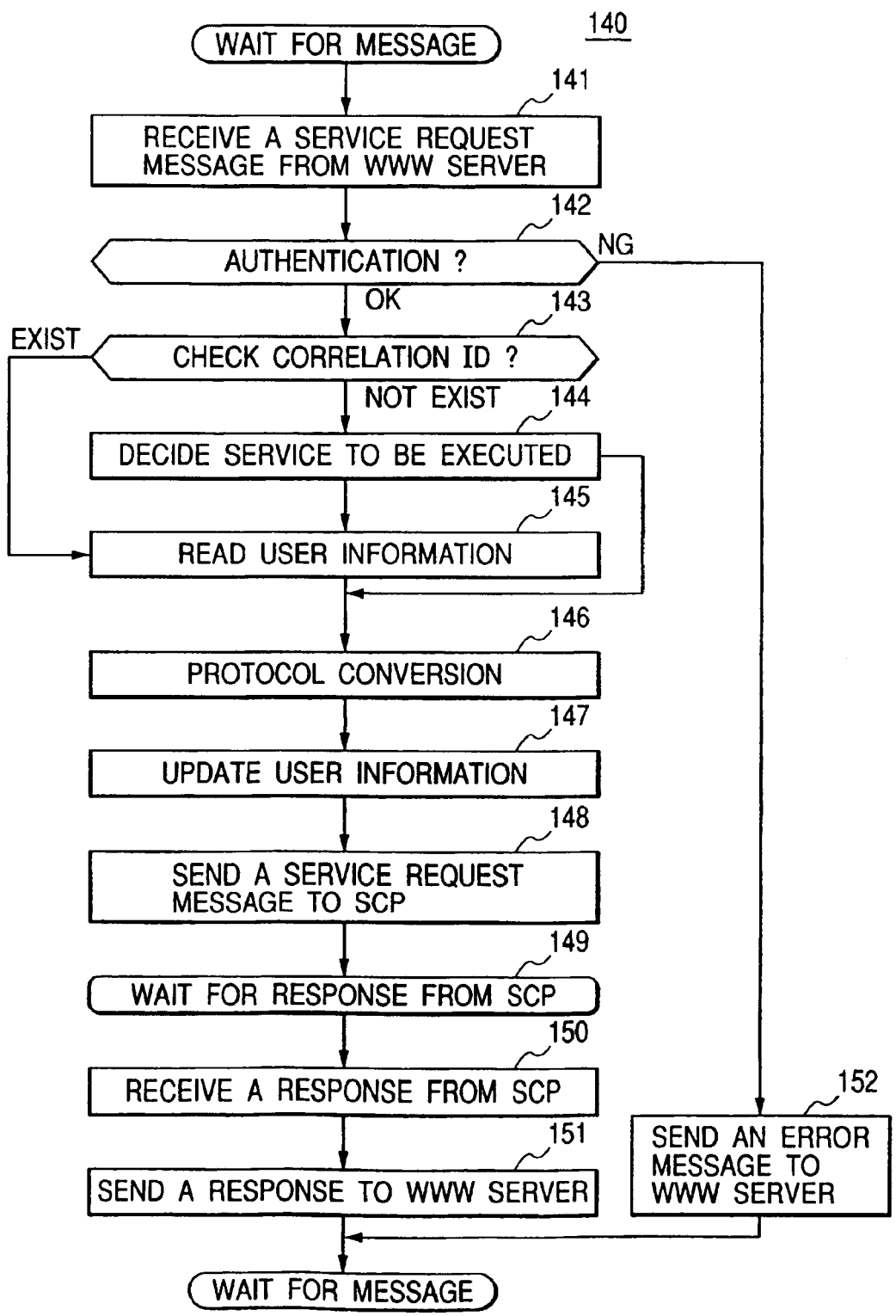
FIG. 14 is a flowchart showing operations of the SCGW 1 which are performed in response to a control message received from the IP network.

When the SCGW 1 receives the IN service request message 205 mentioned above, the SCGW 1 carries out user authentication processing and protocol conversion processing (215) according to an IP packet processing routine 140 shown in FIG. 14. Thus, an IN service request message 216 shown in FIG. 10A is generated and sent to the SCP 2.

More specifically, as shown in FIG. 14, when the SCGW 1 receives the IP packet from the WWW server through the IP network communication interface 13 (step 141), the SCGW 1 checks the user ID 558 contained in the received message against a user ID list of IN service subscribers pre-stored in the memory 12 to judge whether or not the user ID 558 has already been registered for IN service (step 142). If the user ID 558 has not yet been registered for IN service, an error message is returned to the WWW server 3 (step 152).

In case that the user ID 558 has already been registered for IN service, it is checked whether or not the received message contains a correlation ID (step 143). If the received message contains no correlation ID, an SCP address 403 corresponding to the destination of the IN service request and a service number 404 therefor are determined by referencing the SCP address management table 400 shown in FIG. 3A according to a type-of-message code 551 and a network ID 557 extracted from the received message. Then, after a correlation ID 413 to be used for communication between the SCP and the SCGW and a correlation ID 414 to be used for communication between the WWW server and the SCGW are assigned (step 144), protocol conversion is carried out to convert the received message 205 into a packet 800 containing the IN service request message 216 (step 146). If the received message contains a correlation ID, the correlation ID 413 and other necessary data are read out of the user management table 410 (step 145). Then, protocol conversion is carried out using these data (step 146).

Then, in the user management table 410, the state code 416 of an entry corresponding to the user ID is updated. If the entry corresponding to the user ID is not found in the user management table 410, a new entry is added thereto (step 147). Then, the packet generated at step 146 is sent to the SCP 2 (step 148), and the SCGW 1 waits for a response from the SCP 2 (step 149). Upon receiving a response (ACK) 218 from the SCP 2 (step 150), the SCGW 1 sends a response 219 to the WWW server 3 (step 151) and then waits for arrival of the next IP packet.

When the SCP 2 receives the IN service request message 216 from the SCGW 1, the service decision table 460 is referred according to the service number 826 extracted from the received packet to start execution of the service control program "600." Thus, in the user information pointer address table 470, a search is made for a pointer address 473 (e.g., address "xx") corresponding to the telephone number 827 contained in the received message 216. Then, the IP access flag 484 indicating that the user is in access to the Internet and values of the SCGW address 485 and the correlation ID 486 attained from the received message 216 are stored into an entry indicated by the above pointer address in the user information management table 480. Thereafter, a response (ACK) 218 to the IN service request 216 is sent from the SCP 2 to the SCGW 1.

As the result of the aforementioned transfer of the IN service request message from the IP network to the IN network, the IP access flag 484 in the user management table 480 becomes available to judge whether or not the particular user (user ID or telephone number) having subscription to the ICW service is currently in access to the IP network (WWW server). Therefore, when the switching system 4a informs the SCP 2 that an incoming call to the particular telephone number has been detected, the SCP 2 carries out the service control program "500," for example, to make reference to the user management table 480. Thus, a state of the IP access flag 484 corresponding to the particular telephone number is checked. If it is found that the terminal 6b is in access to the IP network, the user is notified of arrival of the incoming call through the SCGW land the WWW server 3. Otherwise, the user is notified of arrival of the incoming call through the switching system 4a.

Referring to FIG. 12, there is shown a message sequence to be carried out when the terminal 6b being in access to the WWW server 3 is called from another terminal (telephone) 6a.

When the switching system 4a receives a call setup request 231 from the terminal 6a and recognizes that the user corresponding to the destination number is an IN service subscriber, the switching system 4a sends an IN service request ("initial DP") message 232 to the SCP 2. Further, the switching system 4a sends a notification of reception of the call setup request ("call proceeding") 233 to the terminal 6a.

Upon receiving the IN service request message 232, the SCP 2 determines a service control program to be executed (e.g., service control program "500") by referring the service decision table 460 according to the trigger information and destination number contained in the received message 232 (step 234). Then, in execution of a user information acquisition routine which is one of functional routines constituting the service control program noted above, a search is made for a pointer address (e.g., "xx") in the user information pointer address table 470 according to the program number 471 and destination number. Then, according to the pointer address found out in the search, ICW service control information items 482 to 486 corresponding to the destination number are acquired from the user information management table 480.

Then, the IP access flag 484, which is one of the above control information items, is checked. If it is found that the called user is in access to the Internet (WWW server), the service control program "500" generates an incoming call notification message 235 shown in FIG. 10B and sends a packet 800 containing the thus generated incoming notification message to the SCGW 1. Thereafter, the service control program "500" waits for a response signal (ACK) from the SCGW 1. If it is found that the called user is not in access to the Internet, the SCP 2 gives an incoming call notification order to the switching system 4a which is the sending source of the IN service request ("initial DP") message 232.

Upon receipt of the response signal (ACK) from the SCGW 1, the service control program "500", waits for a user's notification response message to be returned in answer to the above incoming call notification message 235.

Figure 15:
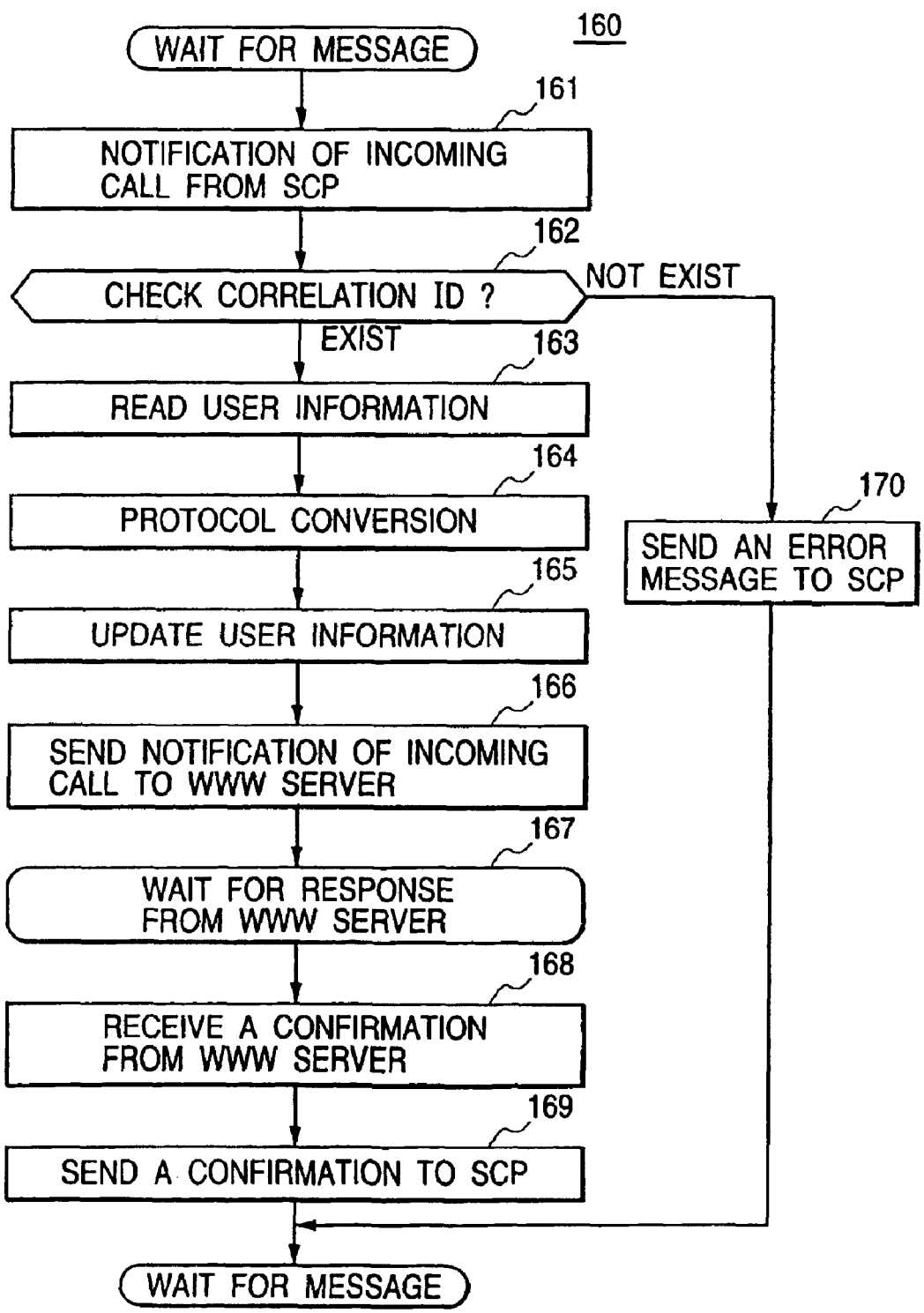
FIG. 15 is a flowchart showing operations of the SCGW 1 which are performed in response to a control message received from the IN network.

When the SCGW 1 receives the incoming call notification message 235 mentioned above, the SCGW 1 carries out an IN packet processing routine 160 shown in FIG. 15 (236).

In execution of the IN packet processing routine 160, when the incoming call notification message 235 is received from the SCP (step 161), the correlation ID 823 contained in the received message 235 is checked (step 162). If it is found that the correlation ID does not match the correlation ID 413 which is stored in the user management table 410 in correspondence with the user ID 833 contained in the received message 235, an error message is returned to the SCP (step 170). If it is found that the correlation ID 823 matches the correlation ID 413, the correlation ID 414, WWW server address 415 and URL 417 are read out of the user management table 410 (step 163). Then, an IP packet 501 containing the incoming call notification message 237 shown in FIG. 8B is generated (step 164), and a code indicating that an incoming call notification is being made is set in the state field 416 of an entry corresponding to the above called user in the user management table 410 (step 165). Thereafter, the IP packet 501 thus generated is sent to the WWW server 3 to which the called user is in access (step 166).

The SCGW 1 waits for a response (ACK) from the WWW server 3 (step 167). Upon receiving a response signal (ACK) 238 from the WWW server 3 (step 168), the SCGW 1 sends a response signal (ACK) 239 as an answer to the incoming call notification message 235 to the SCP 2 (step 169). Thereafter, the SCGW 1 waits for arrival of the next IN packet.

When the WWW server 3 receives the incoming call notification message 237 mentioned above, the response signal (ACK) 238 is sent to the SCGW 1 as an answer to the incoming call notification message. Then, the correlation ID 561 indicated by the incoming call notification message 237 is stored into the correlation ID field 453 of an entry corresponding to the user ID 558 in the user state management table, and a code indicating arrival of an incoming call notification is set in the state field 452 of the above entry. Further, the WWW server 3 reads out incoming call notification display data from the memory according to the URL 559 specified in the incoming call notification message 237, and the incoming call notification display data thus read out is sent as an incoming call notification message 241 to the browser running on the user terminal 6b (240).

In the SCP operations and message transfer operations described above, if the user being in access to the WWW server is called, the incoming call notification message issued by the SCP can be displayed on the window screen of the browser at the user terminal through the SCGW 1 and the WWW server 3.

Referring to FIG. 13, there is shown a message sequence to be carried out when the user who has received the incoming call notification message inputs a response specifying how to process the incoming call.

After the user at terminal 6b has received the incoming call notification message on the browser, the user makes menu selection to specify how to process the incoming call. For example, the user selects any one of the following menu functions: (a) giving the calling user an announcement that the called user is busy; (b) connecting the incoming call to a mail box; (c) connecting the incoming call to a specified destination telephone number of call forwarding; and (d)

disconnecting the incoming call. Described below are operations to be performed when the user selects a call-forwarding menu item and inputs a destination telephone number of call forwarding (261) as a response to the above-mentioned incoming call notification message.

When the user selects the call-forwarding menu item and inputs the destination telephone number of call forwarding, an IP packet 500 (shown in FIG. 6) having the notification response message 262 in which the action code 535 and the destination telephone number of call forwarding 536 are contained is sent from the terminal 6b to the WWW server 3. Upon receiving the notification response message 262, the WWW server 3 carries out a service program (263) corresponding to the type of the received message 531 (431) defined in the request management table 430. In execution of the service program, a notification response message 264 shown in FIG. 8C is generated using address information read out of the service management table 440 and the correlation ID 453 corresponding to the user ID 534 in the received message read out of the user state management table 450. Then, the notification response message 264 thus generated is sent to the SCGW 1 in a form of the IP packet 501.

When the SCGW 1 receives the notification response message 264 mentioned above, the SCGW 1 carries out the IP packet processing routine shown in FIG. 14. In execution of the IP packet processing routine, a notification response message 265 shown in FIG. 10C is generated using the SCP address 403 attained from the SCP address management table 400, the correlation ID 413 stored in the user management table 410 on receipt of the IN service request message 205, the action code 572 and the destination telephone number of call forwarding 573 indicated in the received packet 264. The notification response message 265 thus generated is sent to the SCP 2 in a form of the packet 800.

When the SCP 2 receives the notification response message 265, the SCP 2 carries out the service control program "500" which has been waiting for arrival of the notification response message. In execution of the service control program "500," the correlation ID 823 in the received message 265 is checked against the correlation ID 486 in the user information management table 480 for the purpose of authenticating the received message. When the destination telephone number of call forwarding 842 is identified in the received message, a call-forwarding service control program is called into execution. Thus, a connect message 269 containing the destination telephone number of call forwarding is sent to the switching system 4a. On the other hand, a reception response signal (ACK) 267 to the notification response message 265 is sent to the SCGW 1 (266).

When the switching system 4a receives the connect message 269, the switching system 4a carries out call connection processing (270) for transferring the incoming call to the terminal 6b to the telephone number 842 specified in the above received message. For this purpose, a setup signal 271 is sent to the destination terminal of call forwarding. On the other hand, when the SCGW 1 receives the reception response signal (ACK) 267 from the SCP, the SCGW 1 sends a reception response signal (ACK) 268 to the WWW server 3.

Figure 16:
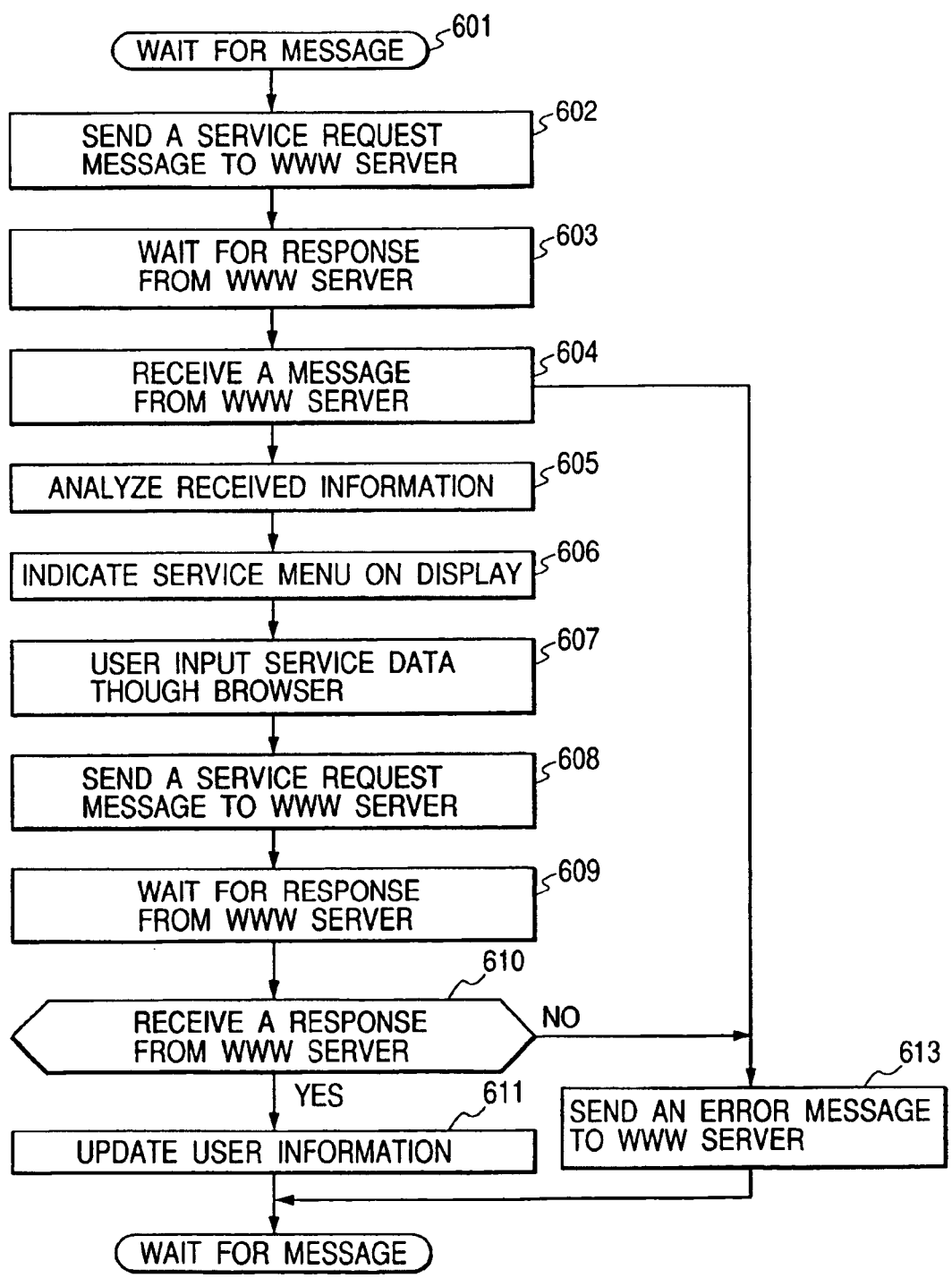
FIG. 16 is a flowchart showing operations of a browser which are performed on the terminal 6 when a user requests an incoming call notification service.

Referring to FIG. 16, there is shown an IN service request routine constituting a functional part of the browser run on the subscriber terminal. The IN service request routine is carried out when the user starts up the browser and selects an IN service menu item of the browser on the subscriber terminal 6b.

When the user performs an input operation to specify the WWW server 3 for IN service transfer, the IN service request routine makes a request to the WWW server for screen display information (step 602). Then, the IN service request routine waits for a response from the WWW server (603). Upon receipt of packet information containing the screen display information from the WWW browser, the IN service request routine analyzes the received information (605) and outputs screen display information on the user terminal (606), whereby an input screen for IN service request is provided to the user.

When the user enters a terminal telephone number (DN) and a user ID (607) and then clicks a SEND button on the above input screen, an IP packet containing the IN service request message 203 shown in FIG. 6 is generated and sent to the WWW server (608). The IN service request routine then waits for a response from the WWW server (609). When a response signal indicating that the message sent from the terminal has been received normally by the WWW server is returned (610), the IN service request routine stores the telephone number (DN), the user ID and a state code indicating that the IN service request is in progress as user information (611). Then, the current execution of the IN service request routine comes to an end. If an error response is returned from the WWW server 3 at step 604 or 610, an occurrence of the error is displayed on the screen of the terminal (613) and then the IN service request routine waits for the user to retry an input.

Figure 17:
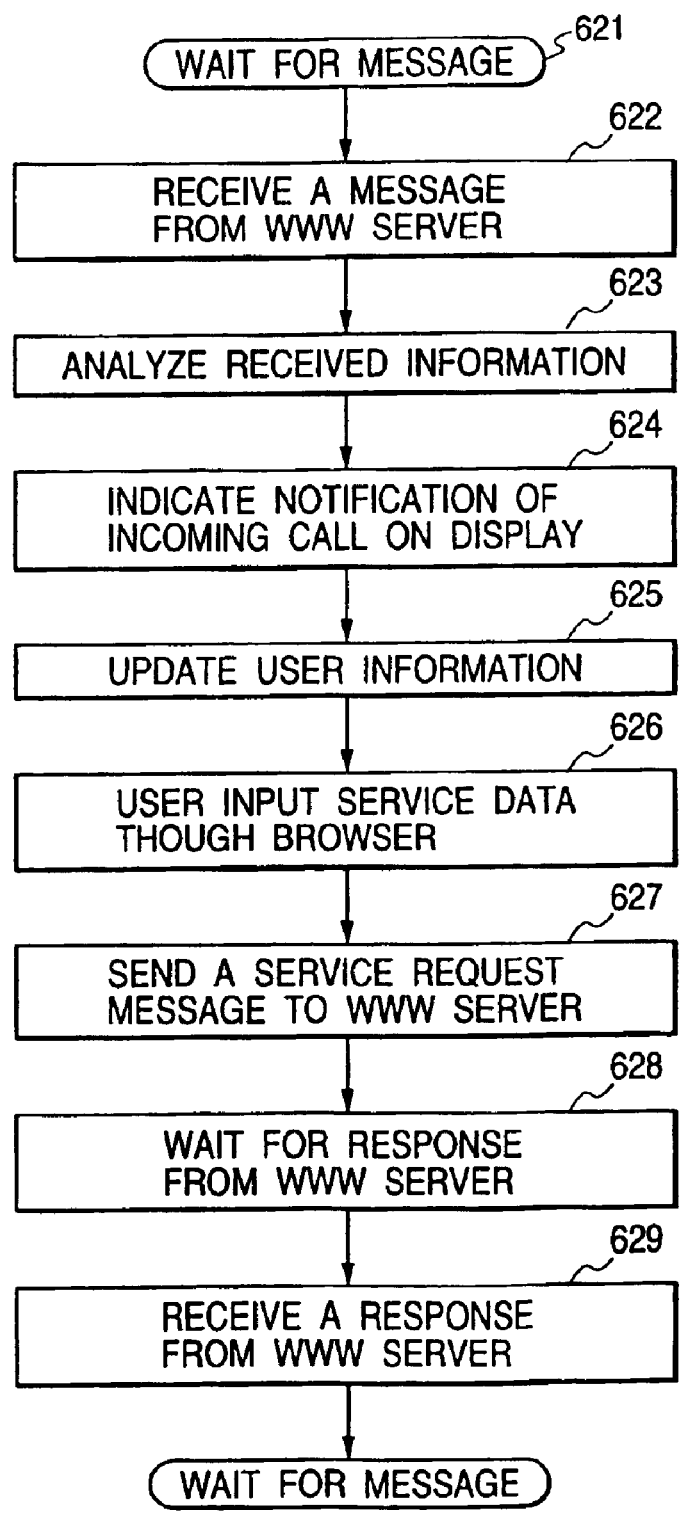
FIG. 17 is a flowchart showing operations of the browser which are performed on the terminal 6 when an incoming call notification message is received from the WWW server.

Referring to FIG. 17, there is shown an IN service notification routine constituting a functional part of the browser run on the subscriber terminal. The IN service notification routine is started up when the WWW server 3 which has received the incoming call notification 237 from the SCGW 1 sends the incoming call notification message 241 to the browser running on the terminal 6b.

The IN service notification routine receives the incoming call notification message 241 from the WWW server (step 622) and analyzes the received message information (623). Then, incoming call notification display data contained in the received message information is presented on the terminal screen (624), and the state code is updated to indicate reception of the incoming call notification message (625). Based on the incoming call notification display data, menu items for how to process the incoming call are displayed on the terminal display screen. For example, the user can select any one of the following menu items: (a) announcement; (b) connection to a mail box; (c) call forwarding; and (d) disconnection.

Thus, on the screen, the user selects one of the menu items. In a case where the user selects the menu item "call forwarding," the user inputs a destination telephone number of call forwarding and then clicks the SEND button (626). Then, a notification response message 262 containing the action code 535 and the destination telephone number of call transfer 536 is generated and sent to the WWW server 3 (627). Thereafter, the IN service notification routine waits for a response from the WWW server (628). When a response signal (ACK) indicating that the notification response message 262 has been received normally by the WWW server is returned (629), the current execution of the IN service notification routine comes to an end. Then, the IN service notification routine waits for arrival of a new message from the WWW server.

As described above, by executing the IN service request routine and the IN service notification routine, the terminal user can input the IN service request, receive the incoming call notification message, and specify how to process the incoming call through the use of the browser screen.

Figure 18:
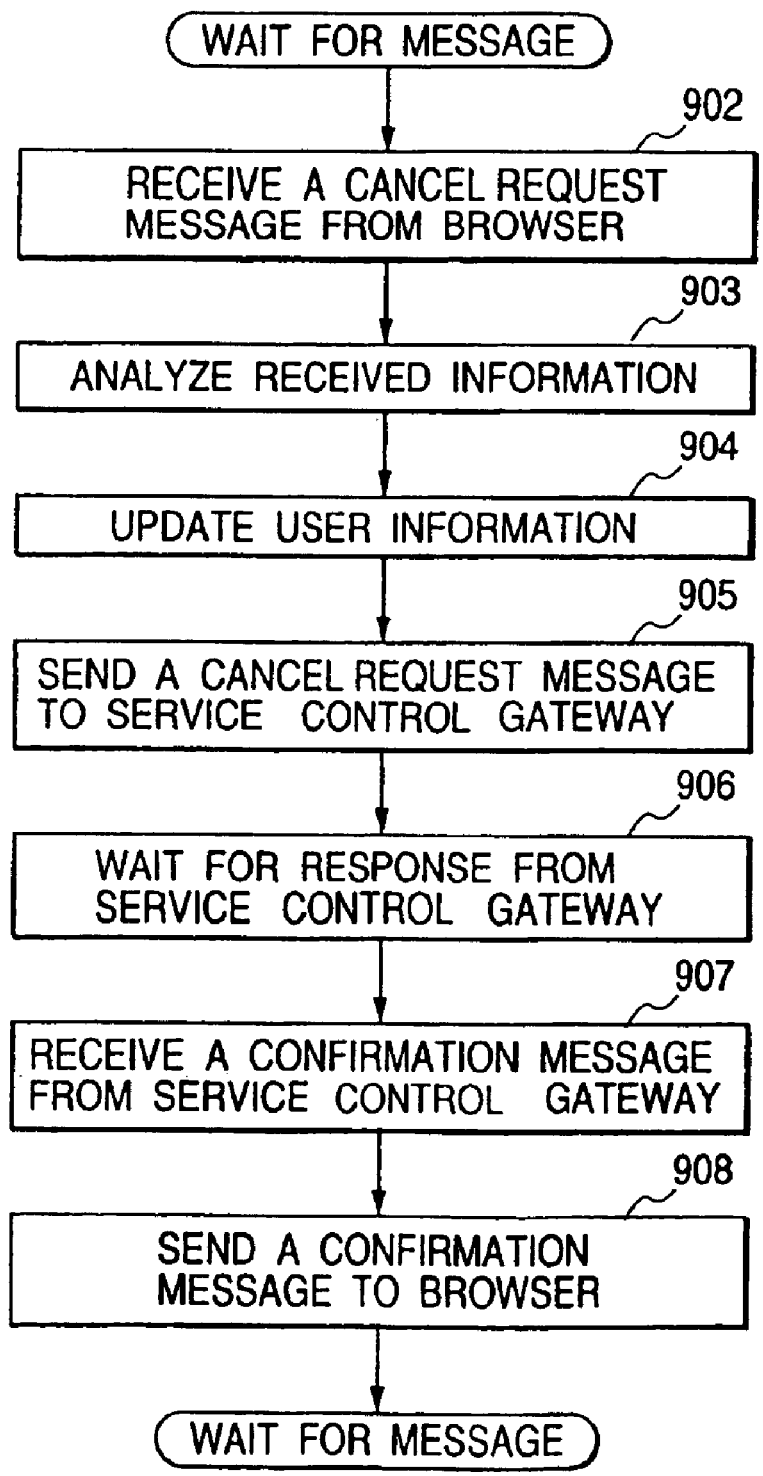
FIG. 18 is a flowchart showing operations of the WWW server which are performed when a call is disconnected.

Referring to FIG. 18, there is shown a flowchart of an IN service terminating routine to be carried out on the WWW server 3 when an IN service cancellation request message is issued from the terminal 6b. The IN service cancellation request message contains a telephone number and a user ID as in the IN service request message 203. For example, when the user selects the IN SERVICE QUIT button or the INTERNET ACCESS QUIT button available on the browser screen, the IN service cancellation request message is sent to the WWW server 3.

When the WWW server 3 receives the IN service cancellation request message from the terminal 6b (902), the IN service terminating routine analyzes the received message (903). Then, an entry corresponding to the user ID contained in the above received message is removed from the user state management table 450, or the state field 452 of the entry is updated to indicate cancellation of the IN service (904.). Then, after sending an IN service cancellation request message to the SCGW 1 (905), the IN service terminating routine waits for a response from the SCGW (906).

When the SCGW 1 receives the above cancellation request message, an entry corresponding to the user ID contained in the received message is removed from the user management table 410, or the state field 416 of the entry is updated to indicate cancellation of the IN service. Then, the SCGW 1 sends an IN service cancellation request message to the SCP 2. Upon receiving the IN service cancellation request message, the SCP 2 clears the IP access flag 484 corresponding to the user ID in the user information management table 480, and then the SCP 2 returns a confirmation response signal of service cancellation to the SCGW 1. The confirmation response signal of service cancellation is transferred from the SCGW 1 to the WWW server 3. When the WWW server 3 receives the confirmation response signal of service cancellation from the SCGW 1 (907) the WWW server 3 sends a confirmation signal of service cancellation to the browser running on the terminal 6b (908). Then, the current execution of the IN service terminating routine comes to an end.

Figure 19:
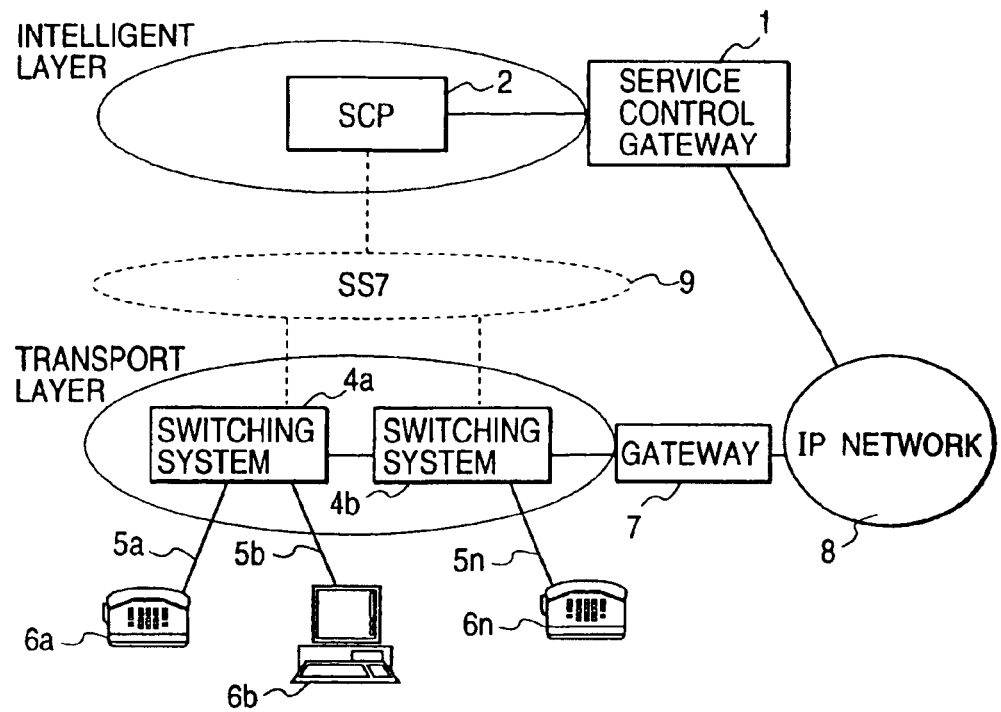
FIG. 19 is a diagram showing a network configuration in a second preferred embodiment of the present invention where the IP network and the SCP in the intelligent network are connected through a gateway 7 and the service control gateway 1.

Referring to FIG. 19, there is shown a network configuration of a second preferred embodiment of the present invention.

As compared with FIG. 1, the network configuration shown in FIG. 19 is characterized in that the SCP in the intelligent network is connected with the IP network through the service control gateway (SCGW) 1 and in that the gateway 7 for connecting the transport layer network of the intelligent network and the IP network is provided with a function for communication with the SCGW 1. The SCGW 1 is connected with the IP network through a router (not shown), for example. In a modified arrangement, the SCGW 1 may also be connected with an IP network communication interface incorporated in the gateway 7.

As to the SCGW 1 in the second preferred embodiment of the present invention, it is just required to provide such an arrangement that the gateway 7 is used as a communicating point of the IP network in lieu of the WWW server 3 in the IP packet processing routine shown in FIG. 14 and the IN packet processing routine shown in FIG. 15. Essentially, the configuration of the SCGW 1 is equivalent to that exemplified in the first preferred embodiment of the present invention.

The gateway 7 is equipped with a function necessary for dial-up connection of the subscriber terminal 6 to the IP network, a function for communication with the terminal 6 using the Internet protocol, and a function for IN service control message communication with the SCGW 1, which is implemented using the WWW server 3 in the first preferred embodiment.

To realize these functions, the gateway 7 contains authentication information of each subscriber, supplementary service information of each subscriber, the Internet call waiting service management tables 430 to 450 described with reference to FIGS. 4A to 4C, and a plurality of programs for carrying out control operations using these information.

In contrast with the first preferred embodiment wherein the IN service request message is sent from the terminal 6 to the IP network when the user being in access to the Internet performs an IN service request input operation, the second preferred embodiment is arranged as mentioned below: When a connection for IP communication is established between the terminal and the gateway 7, the gateway 7 automatically generates an IN service request message, which is then sent to the SCGW 1. As the gateway 7 suitable for providing the IN service message processing functions noted above, an access point operated and managed by an Internet service provider may be used practically.

The subscriber terminal 6b is provided with a dial-up connection function and a program equivalent to the IN service notification routine shown in FIG. 17, which is used for sending and receiving IN service control messages in communication with the gateway 7 instead of the WWW server employed in the first preferred embodiment when the subscriber terminal 6b is being connected to the Internet.

Figure 20:
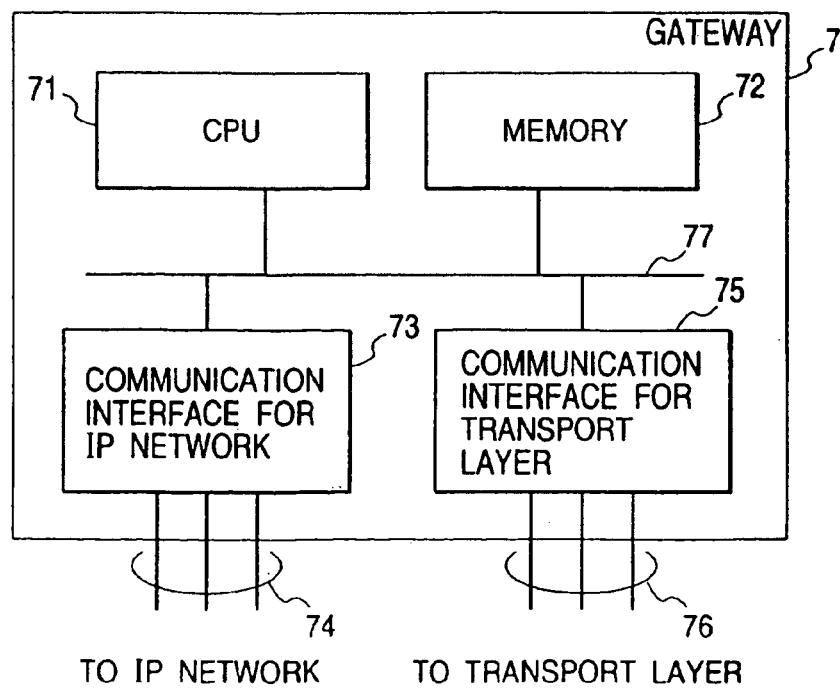
FIG. 20 is a diagram showing a configuration of the gateway 7 indicated in FIG. 19.

Referring to FIG. 20, there is shown a configuration of gateway 7.

The gateway 7 comprises a CPU 71 for controlling communication between the terminal 6 and the SCGW 1, a memory 72 for storing various information and programs necessary for implementing the functions mentioned above, an IP network communication interface 73 for terminating a signal line 74 connected with the IP network, a transport layer communication interface 75 for terminating a signal line 76 connected with the transport layer network of the intelligent network, and a bus 77 for connecting these component elements. Communication between the CPU 71 and the SCGW 1 is carried out according to the Internet protocol using the packet shown in FIG. 7, and communication between the CPU 71 and the transport layer network is carried out according to the N-ISDN user-network interface protocol, for example.

Figure 21:
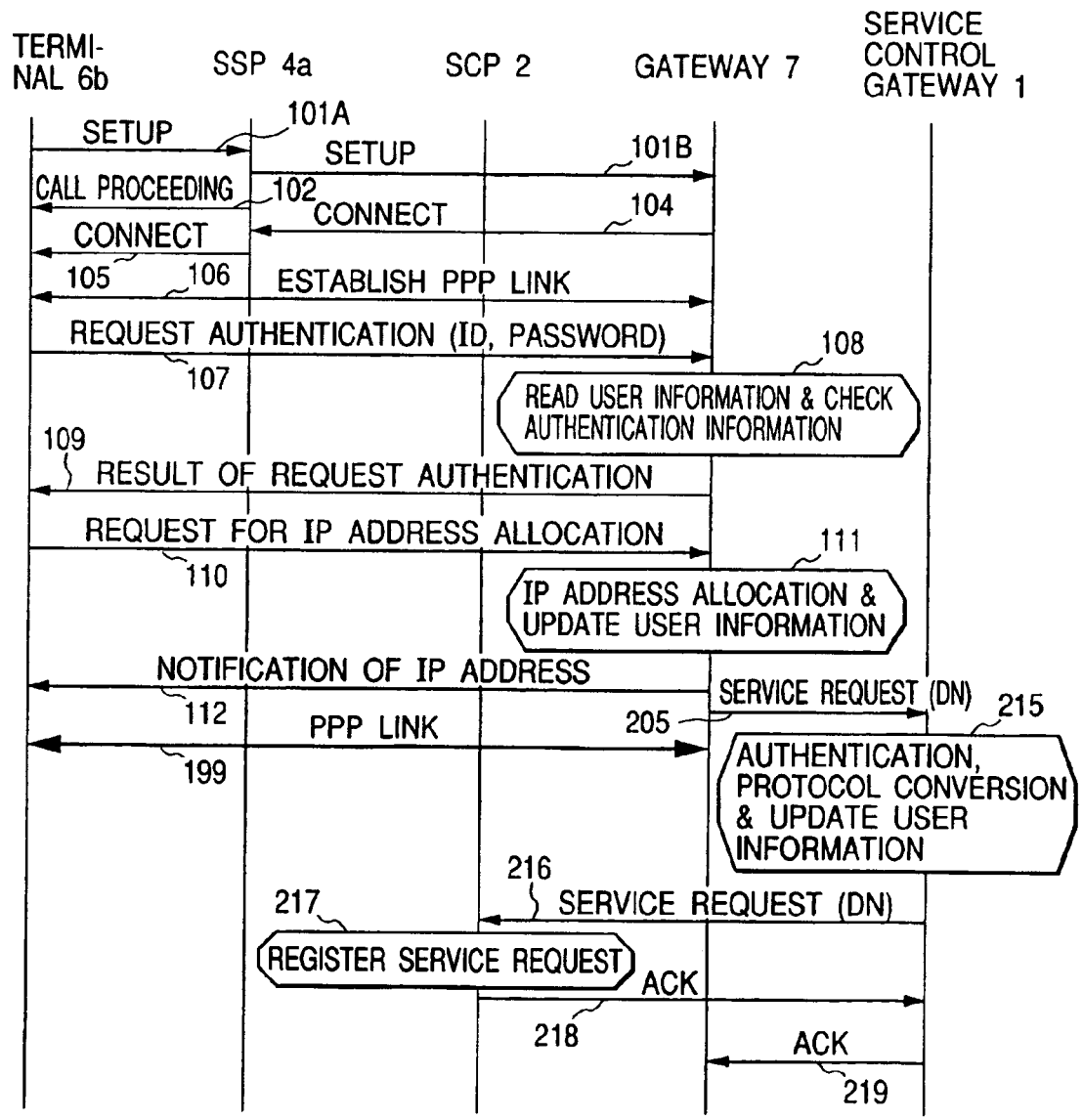
FIG. 21 is a signal sequence diagram showing control signals and messages which are transmitted in the communication network presented in FIG. 19 when a terminal issues a call setup request message.
Figure 22:
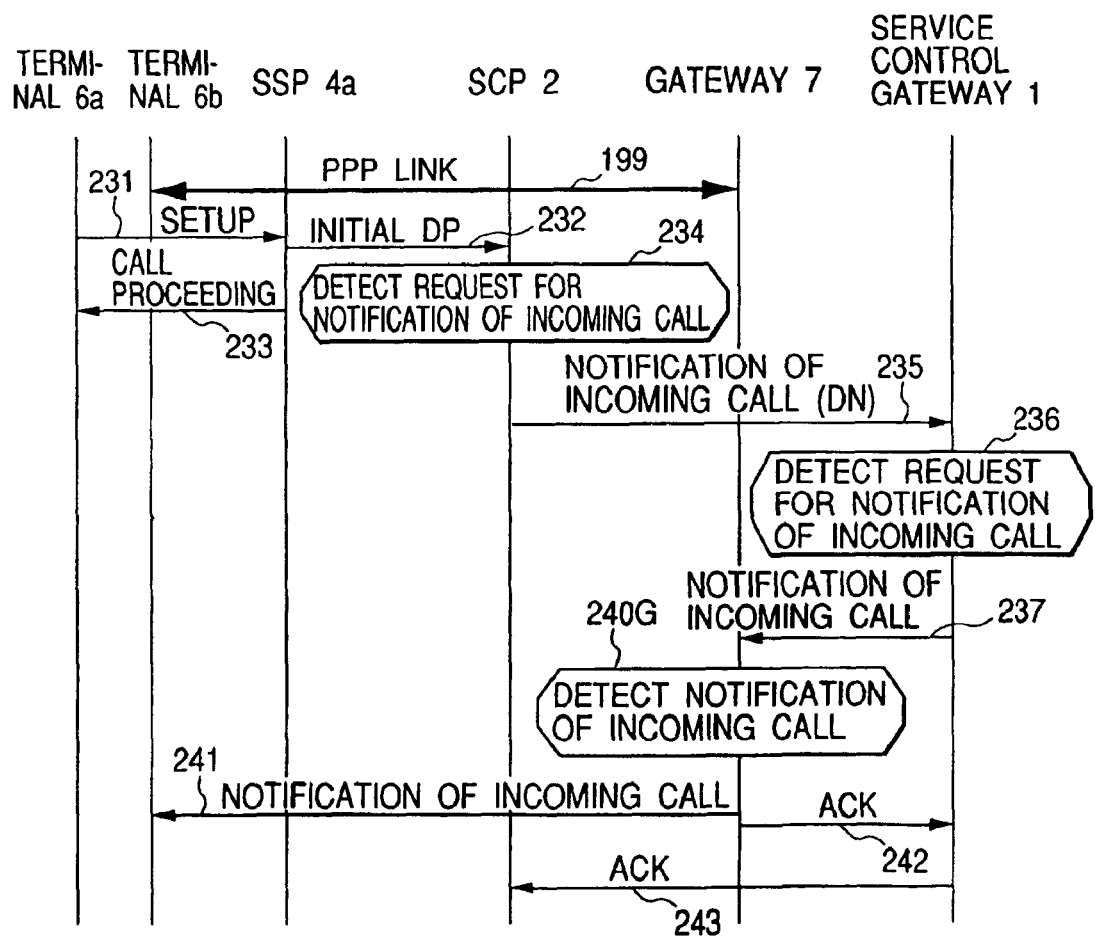
FIG. 22 is a signal sequence diagram showing control signals and messages which are transmitted in the communication network presented in FIG. 19 when the above-noted terminal is called.
Figure 23:
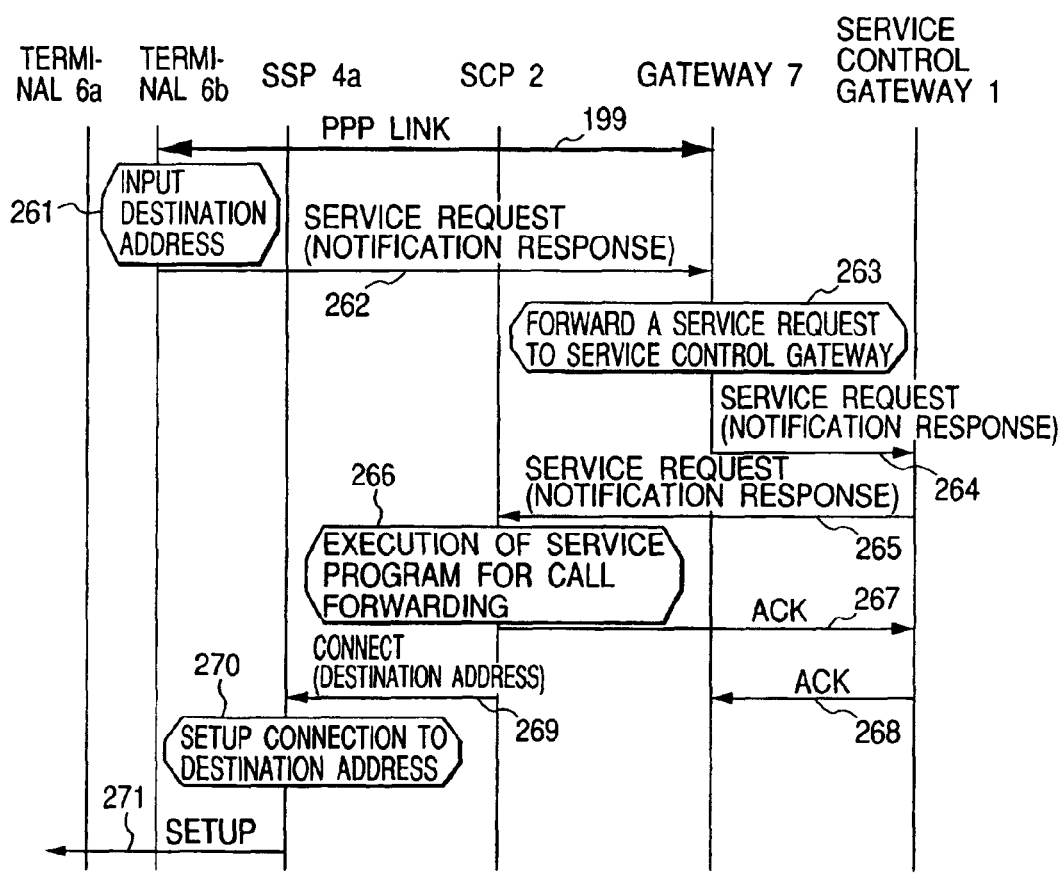
FIG. 23 is a signal sequence diagram showing control signals and messages which are transmitted in the communication network presented in FIG. 19 when a notification response message indicating a request for call forwarding to a designated destination is issued from the above-noted terminal.

The following describes Internet call waiting service control procedures to be performed in the communication network configuration in the second preferred embodiment of the present invention with reference to FIGS. 21 to 23.

Referring now to FIG. 21, when the user at the terminal 6b sends a setup signal 101A to the gateway 7 for connection to the IP network 8 using the dial-up function, the switching system 4a connected with the terminal 6b transfers the setup signal 101A as a setup signal 101B to the gateway 7 and returns a call reception signal ("call proceeding") 102 to the terminal 6b.

Figure 24:
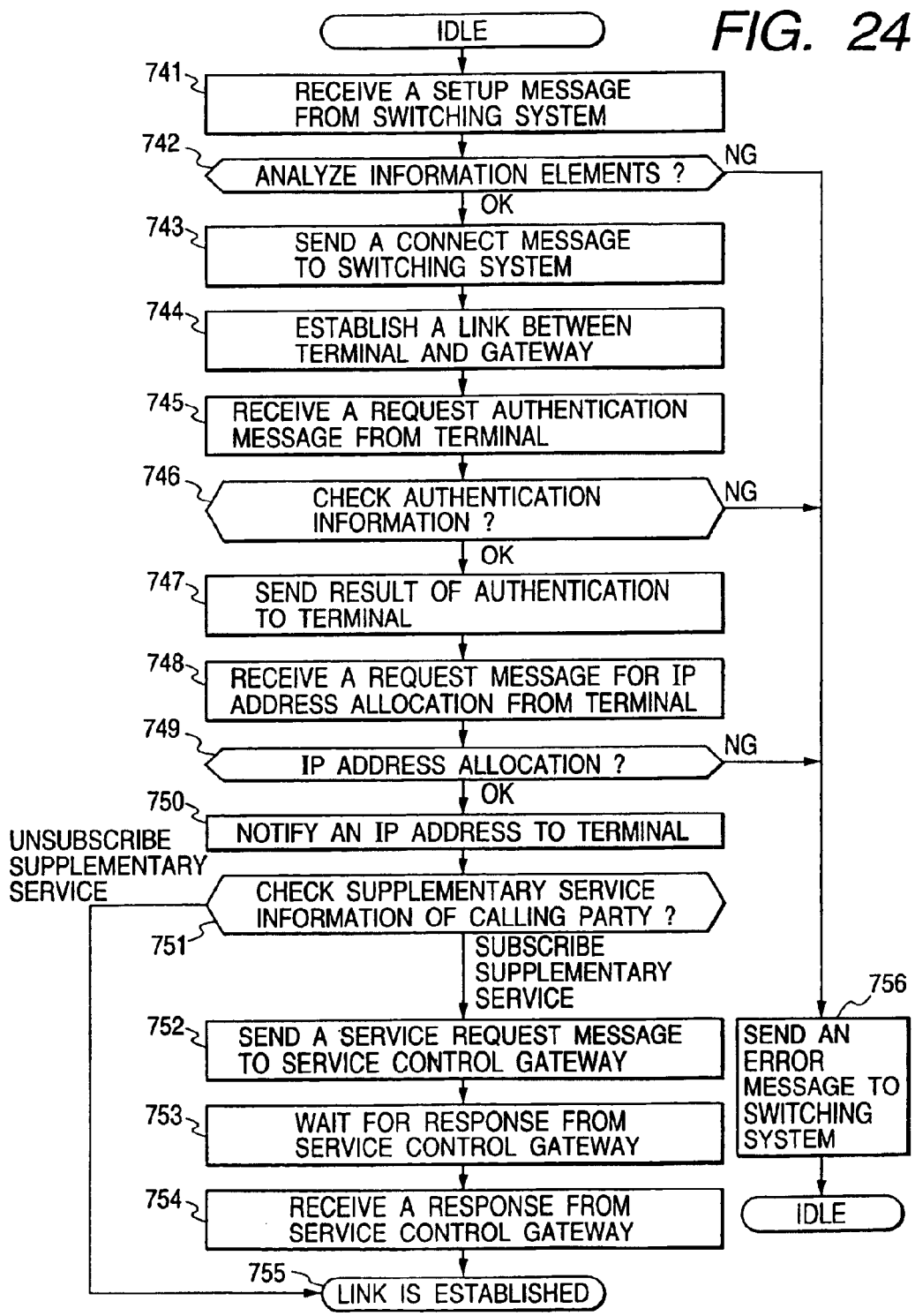
FIG. 24 is a flowchart showing a call signal processing routine which is carried out on the gateway 7 when a call setup message is received from the terminal.

In response to the setup signal 101, the gateway 7 carries out a call signal processing routine shown in FIG. 24.

More specifically, when the gateway 7 receives the setup signal 101 from the transport layer communication interface 75 (step 741), the call signal processing routine analyzes information elements contained in the received signal to judge whether or not an incoming call can be accepted (step 742). If it is found that the incoming call is acceptable, the gateway 7 sends a response signal ("connect") 104 to the switching system 4a (step 743). Upon receiving this response signal, the switching system 4a sends a response signal ("connect") 105 to the terminal 6b. Thus, a telephone line connection is set up between the gateway 7 and the terminal 6b.

Thereafter, the gateway 7 proceeds to a PPP (point-to-point protocol) connection operation for IP packet communication with the terminal 6b through the telephone line connection mentioned above. First, using the LCP (link control protocol) for example, a link 106 is established between the terminal 6b and the gateway 7. Then, when a request authentication message containing a user ID and a password is received from the terminal 6b (step 745), authentication processing 108 is performed on the user ID and password using authentication information stored in the memory 72 (step 746). If the user ID and password are authenticated, an authentication response signal 109 is sent to the terminal 6b (step 747). In a modified arrangement, this authentication processing may be carried out by a user authentication server (not shown) connected with the gateway 7.

When the gateway 7 receives an IP address allocation request 110 from the terminal 6b (step 748), an unused IP address is acquired from an IP address pool formed in the memory 72 and correspondence relationship between the unused IP address and the user ID is stored into the user information table (step 749). Then, the terminal 6b is notified of the IP address 112 (step 750).

Thereafter, the gateway 7 searches a per-user IN service information table pre-stored in the memory 72 (step 751). When it is found that the user at terminal 6b is an IN service subscriber, an IN service request message 205 shown in FIG. 8A is generated and sent to the SCGW 1 (step 752). Then, the gateway 7 waits for a reception response signal (ACK) 219 from the SCGW 1. Upon receiving the reception response signal (ACK) 219 from the SCGW 1 (step 754), the gateway 7 is put in a PPP connection state 199.

In execution of the call signal processing routine, if analysis of setup signal information elements at step 742 indicates that the incoming call is not acceptable, if user authentication at step 746 is not successful, or if address allocation check at step 749 indicates that there is no unused IP address available in the IP address pool, an error message is sent to the terminal 6b (step 756).

When the SCGW 1 receives the IN service request message 205 mentioned above, the SCGW 1 carries out the IP packet processing routine shown in FIG. 14 as in the first preferred embodiment of the present invention. After legality of the user is checked through user authentication processing, a protocol-converted IN service request message 216 is sent to the SCP 2. When the SCGW 1 receives a reception response signal (ACK) 218 from the SCP 2, the SCGW 1 sends a reception response signal (ACK) 219 to the gateway 7 which is the sending source of the IN service request message 205. Then, the IP packet processing routine comes to an end. When the SCP 2 receives the IN service request message 216, the SCP 2 carries out service request registration processing 217 in a manner similar to that in the first preferred embodiment.

Referring to FIG. 22, there is shown a message sequence to be performed when the terminal 6b being in PPP connection to the gateway 7 is called from another terminal 6a.

Figure 25:
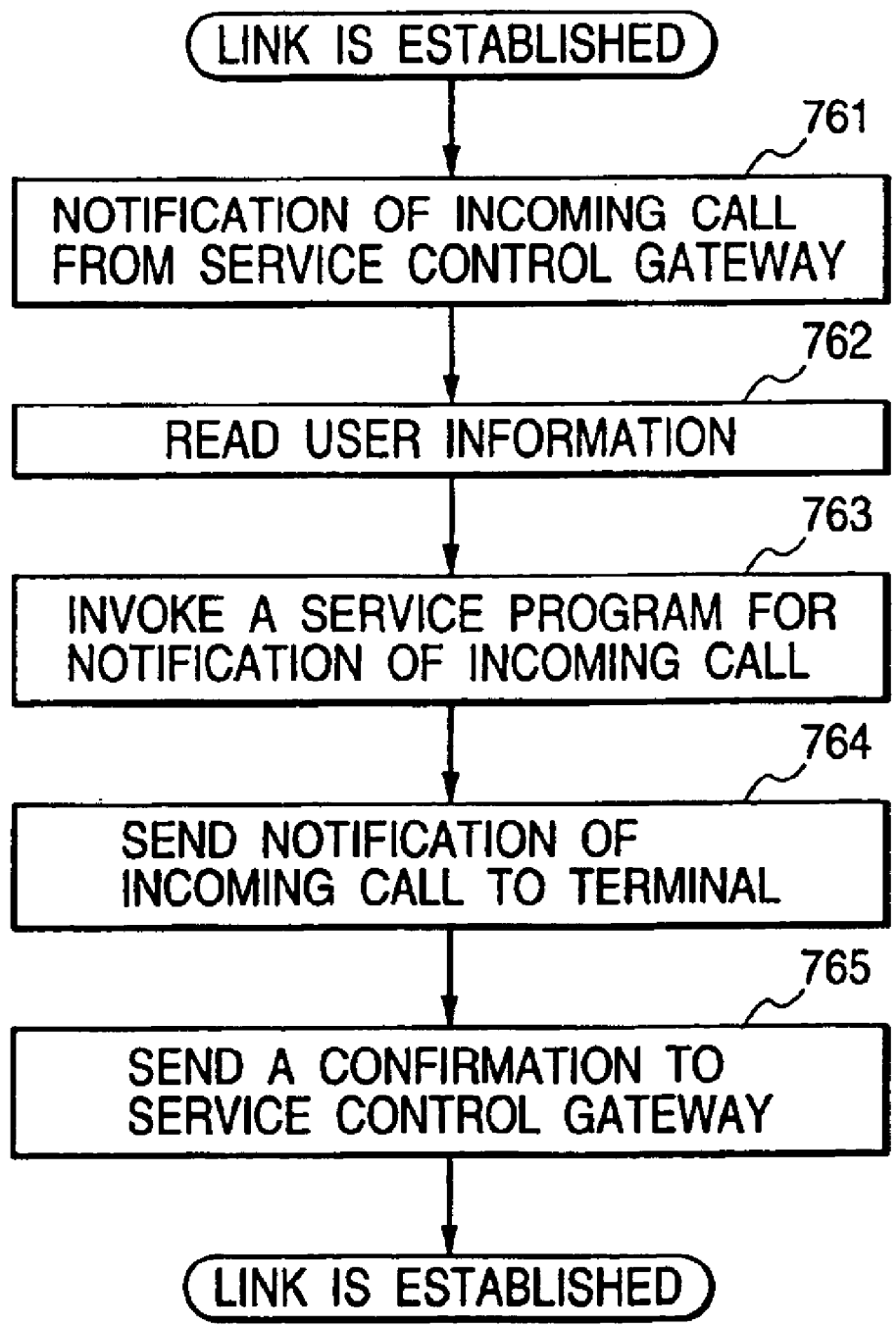
FIG. 25 is a flowchart showing a an incoming call notification processing routine which is carried out on the gateway 7 when an incoming call notification message is received from the service control gateway 1.

Unlike the first preferred embodiment shown in FIG. 12, an incoming call notification message 237 transmitted from the SCGW 1 is received by the gateway 7 in the second preferred embodiment. In lieu of the WWW server 3 in the first preferred embodiment, the gateway 7 sends an incoming call notification message 241 to the terminal 6b and a reception response signal (ACK) 242 to the SCGW 1 using a program shown in FIG. 25.

More specifically, when the gateway 7 receives the incoming call notification message 237 from the SCGW 1 (step 761), the gateway 7 invokes a service program corresponding to the type of the received message 551. Thus, an IP address corresponding to the user ID 558 indicated by the above received message is read out of the user information table (step 762) in which correspondence relationship between the IP address and the user ID has been stored at step 111 (step 749 in FIG. 24) shown in FIG. 21. Then, an incoming call notification processing routine is invoked to generate an incoming call notification IP packet destined for the IP address thus read out (step 763). The gateway 7 then sends the incoming notification message to the terminal 6b (step 764) and the response signal (ACK) 242 to the SCGW 1 as an answer to the incoming call notification message 237 mentioned above (step 765).

Referring to FIG. 23, there is shown a message sequence to be performed when the user who has received the incoming call notification message inputs a response specifying how to process the incoming call.

Figure 26:
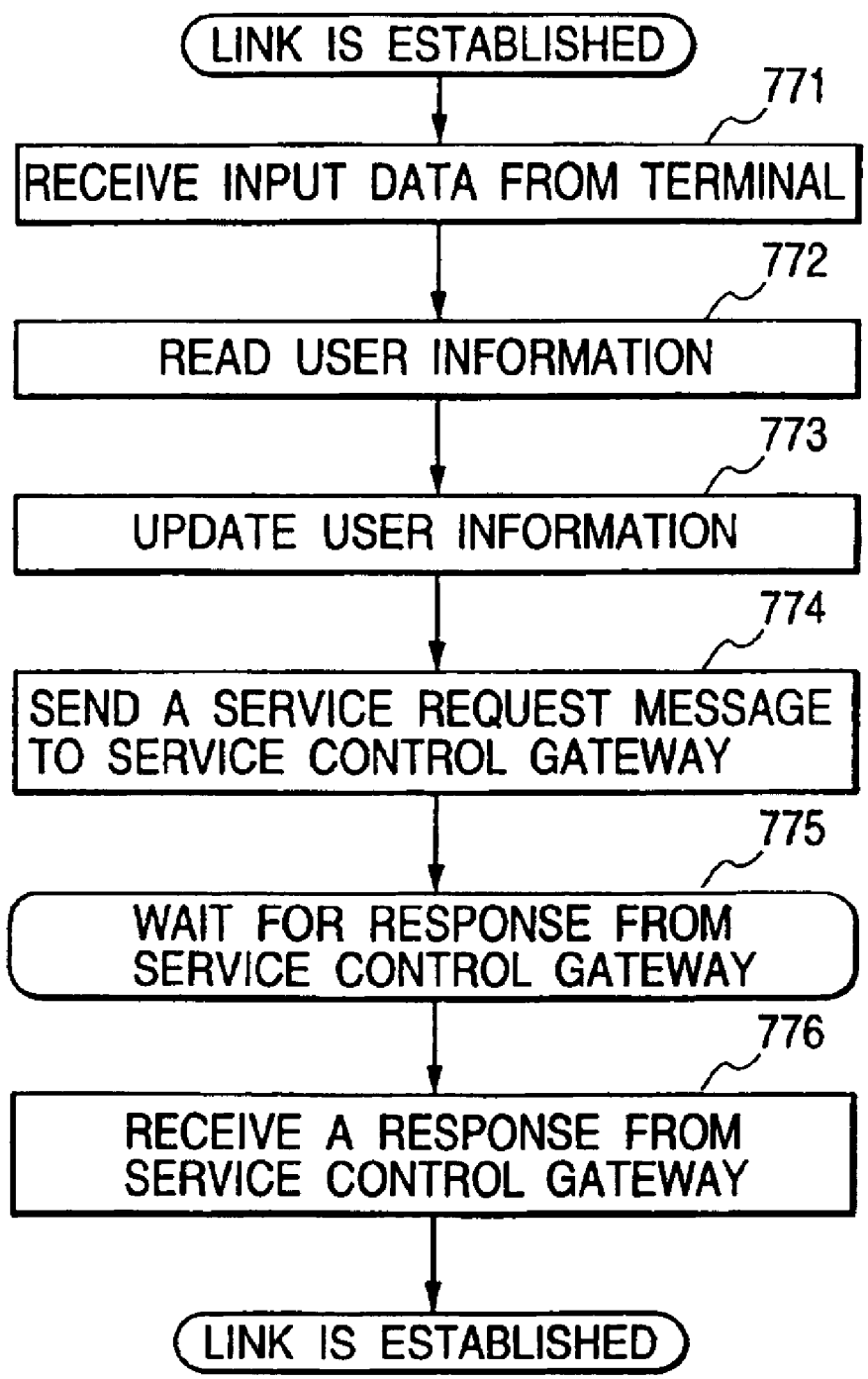
FIG. 26 is a flowchart showing a notification response processing routine which is carried out on the gateway 7 when a notification response message is received from the terminal.

Unlike the first preferred embodiment shown in FIG. 13, a notification response message 262 issued from the terminal 6b is received by the gateway 7 in the second preferred embodiment. In lieu of the WWW server 3 in the first preferred embodiment, the gateway 7 sends a notification response message 264 to the SCGW 1 using a program routine shown in FIG. 26.

In a situation where the user at the terminal 6b who has received the incoming call notification message selects a call-forwarding item from the menu displayed on the terminal screen, for example, as a method for processing the incoming call and then the user specifies a destination telephone number of call forwarding (261), a notification response message 262 in the format shown in FIG. 6 is issued from the terminal 6b to the gateway 7. When the gateway 7 recognizes that the message received from the terminal is a notification response, the gateway 7 carries out the notification response processing routine shown in FIG. 26.

In execution of the notification response processing routine, when the notification response message 262 is received (step 771), the SCGW address and the correlation ID are read out of the service management table 440 and the user state management table 450, respectively. A notification response message 264 shown in FIG. 8C is generated (step 772), and the state field 452 in the user state management table 450 is updated to indicate a notification response state (step 773). Then, the notification response message 264 is sent to the SCGW 1 (step 774). Thereafter, the gateway 7 waits for a reception response signal (ACK) 268 from the SCGW 1 (step 775). When the reception response signal (ACK) 268 is received from the SCGW 1 (step 776), the notification response processing routine comes to an end. The operations of the SCGW 1 upon receipt of the notification response message 264 and the operations of the SCP 2 upon receipt of the notification response message 265 from the SCGW 1 are performed in the same fashion as in the first preferred embodiment.

Figure 27:
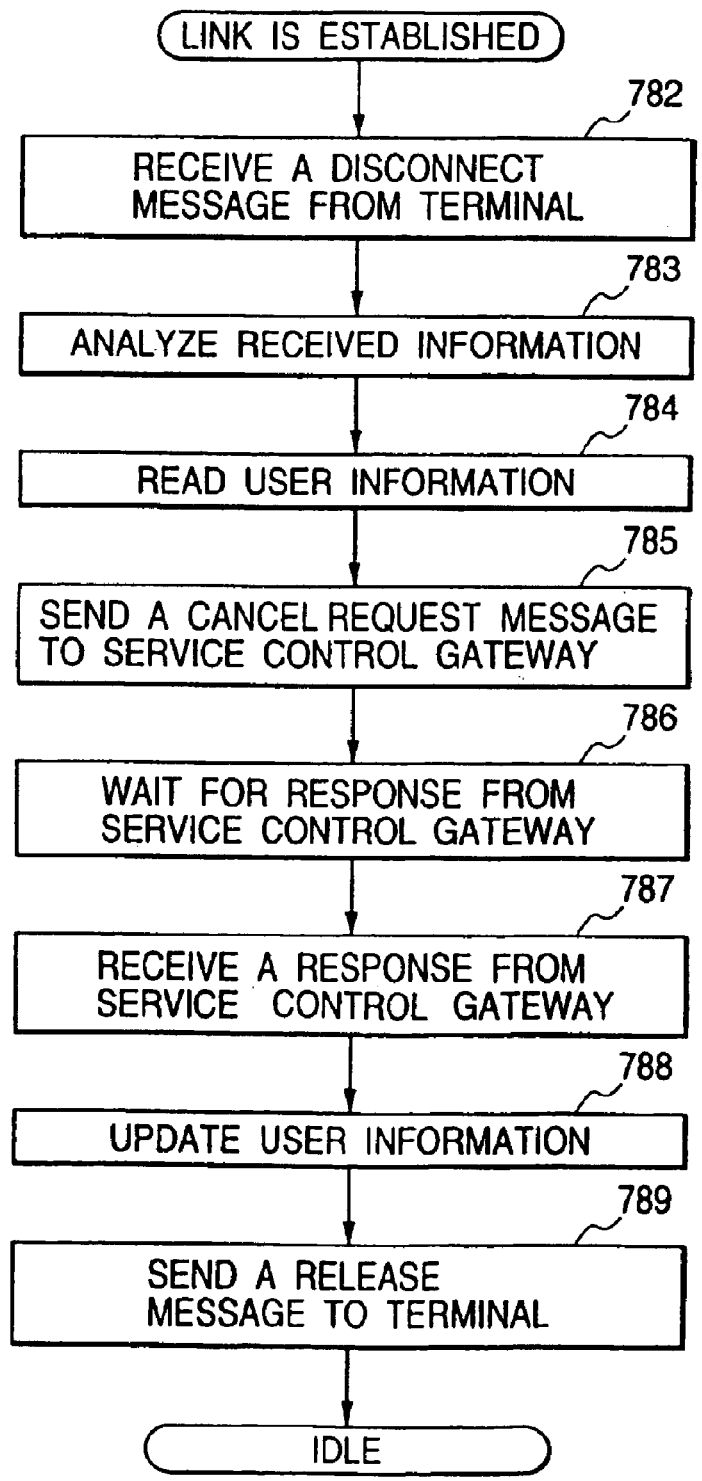
FIG. 27 is a flowchart showing an IN service terminating routine which is carried out on the gateway 7 when a call is disconnected.

Referring to FIG. 27, there is shown a flowchart of an IN service terminating routine to be carried out in the gateway 7 upon disconnection between the terminal 6b and the gateway 7.

In execution of the IN service terminating routine, when a disconnect signal is received from the switching system 4 (step 782), the received signal is analyzed (step 783) and the correlation ID 453 is read out of the user state management table 450 (step 784). Then, an IN service cancellation request message is sent to the SCGW 1 (step 785), and the gateway 7 waits for a response signal from the SCGW 1 (step 786). When the gateway 7 receives the response signal from the SCGW 1 (step 787), the IP address allocated to PPP communication and the correlation ID 435 used for communication between the gateway 7 and the SCGW 1 are released and the state information 452 is cleared (step 788). Then, a release signal is sent to the switching system 4 (step 789), and the IN service terminating routine comes to an end.

As described in the first preferred embodiment with reference to FIG. 18, when the SCGW 1 receives the IN service cancellation request message from the gateway 7, an entry corresponding to the terminal user is removed from the user management table 410, or the state code is updated to indicate cancellation of the IN service. Then, the SCGW 1 sends an IN service cancellation request message to the SCP 2. Upon receiving the IN service cancellation request message, the SCP 2 clears the IP access flag corresponding to the terminal user in the user information management table. Thus, the incoming call notification service to the user from the SCP through the IP network is terminated when the user disconnects communication to the Internet.

As set forth above and according to the present invention, while the user is being connected to the Internet, the service control point (SCP) in the intelligent network can send an incoming call notification message to the user over the Internet. Further, by transferring a notification response from the user to the SCP over the Internet, the SCP can issue to a switching system a switching instruction such as the forwarding of the incoming call to a user-specified terminal, announcement to the calling user, or disconnection of the incoming call.

What is claimed is:

1. A service control gateway adapting to connect an intelligent layer network and an Internet Protocol (IP) network, said intelligent layer network having an intelligent network service control point for providing an Internet call waiting service to a terminal communicating with a server connected to the IP network, said intelligent network service control point being connectable to a plurality of switching systems in a transport layer network over a common channel signaling network, said transport layer network being connectable to said gateway via said IP network, and said switching systems being connectable to a plurality of terminals, the service control gateway comprising:

a first interface adapted to connect the service control gateway with the IP network;

a second interface adapted to connect the service control gateway with the intelligent layer network;

a memory in which predetermined programs are stored;

a processor for executing the programs;

a service control point (SCP) address management table including network ID information to identify the intelligent layer network where an Internet call waiting service requester is accommodated, service ID information, message type information, and address information of the SCP; and a user address management table including user ID information, user telephone number information, first correlation ID information for judging correspondence of massages transmitted between the service control point and the service control gateway, second correlation ID information for judging correspondence of messages transmitted between the server and the service control gateway, and address information of the server and service status information, wherein said first interface is arranged to receive an Internet call waiting service request message for one of said terminals via the IP network, and wherein said processor refers to the SCP address management table and the user address management table when the Internet call waiting service request message is received, selects one service control point to which the request message should be transferred, converts a protocol of the request message into that available at the service control point, and sends the protocol-wise converted message to the service control point via said second interface.

2. A service control gateway according to claim 1, further comprising:

protocol conversion means for protocol-wise converting an incoming call notification message indicating arrival of an incoming call to said terminal into a message addressed to a server being in communication with the terminal, said incoming call notification message having been received from said service control point, wherein said processor sends the protocol-wise converted incoming call notification message to said server.

3. A service control gateway according to claim 1, further comprising:

protocol conversion means for protocol-wise converting an incoming call notification message indicating arrival of an incoming call to said terminal into a message addressed to an access point apparatus being in communication with said terminal, said incoming call notification message having been received from said service control point, and said access point apparatus being connected to said IP network and having a function for transferring messages received from said service control gateway to said terminal, wherein said processor sends the protocol-wise converted incoming call notification message to said IP network via said first interface.

* * * * *